US012710745B2

(12) United States Patent
Yang

(10) Patent No.: US 12,710,745 B2
(45) Date of Patent: Aug. 18, 2026

(54) STATIC ELIMINATOR AND STATIC ELIMINATION SYSTEM

(71) Applicant: Keyence Corporation, Osaka (JP)

(72) Inventor: Saeyoung Yang, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 397 days.

(21) Appl. No.: 18/230,238

(22) Filed: Aug. 4, 2023

(65) Prior Publication Data

US 2024/0077855 A1 Mar. 7, 2024

(30) Foreign Application Priority Data

Sep. 7, 2022 (JP) ................................ 2022-142585
Nov. 4, 2022 (JP) ................................ 2022-177303

(51) Int. Cl.
*G05B 19/418* (2006.01)
*H05F 3/06* (2006.01)

(52) U.S. Cl.
CPC ................. *G05B 19/41875* (2013.01); *G05B 2219/32368* (2013.01); *H05F 3/06* (2013.01)

(58) Field of Classification Search
CPC .. H01T 23/00; H05F 3/04; H05F 3/06; G05B 19/41875
See application file for complete search history.

(56) References Cited

U.S. PATENT DOCUMENTS 7,649,728 B2 1/2010 Fujita et al.
8,587,917 B2 11/2013 Fujita
11,606,855 B1 * 3/2023 Hong ...................... H01T 23/00
2004/0145852 A1 * 7/2004 Kraz ...................... H01T 23/00 361/225
2012/0081831 A1 * 4/2012 Ishii ...................... F24F 13/32 361/231
2014/0333331 A1 * 11/2014 Savich .............. G01R 27/2605 324/679
2018/0231167 A1 * 8/2018 Wallace ................ G01K 13/02
2019/0369051 A1 * 12/2019 Maroni ................. H05K 1/144

FOREIGN PATENT DOCUMENTS

JP 10-289796 A 10/1998
JP 2007258108 A 10/2007

OTHER PUBLICATIONS

U.S. Appl. No. 18/230,223, filed Aug. 4, 2023 (75 pages).
U.S. Appl. No. 18/230,232, filed Aug. 4, 2023 (84 pages).
U.S. Appl. No. 18/230,243, filed Aug. 4, 2023 (98 pages).

* cited by examiner

*Primary Examiner* — Scott Bauer
(74) *Attorney, Agent, or Firm* — Kilyk & Bowersox, P.L.L.C.

(57) ABSTRACT

To provide a static eliminator and a static elimination system capable of strictly managing a manufacturing status of a product without increasing a management burden. The static eliminator includes an ion generation unit, an ion control unit, a measurement value acquisition unit, a data generation unit, and a nonvolatile storage unit. The ion generation unit generates ions. The ion control unit controls the ion generation unit. The measurement value acquisition unit acquires a measurement value related to control by the ion control unit and acquires a measurement time at which the measurement value has been acquired. The data generation unit generates history data based on the measurement value and the measurement time. The nonvolatile storage unit stores the history data.

12 Claims, 25 Drawing Sheets

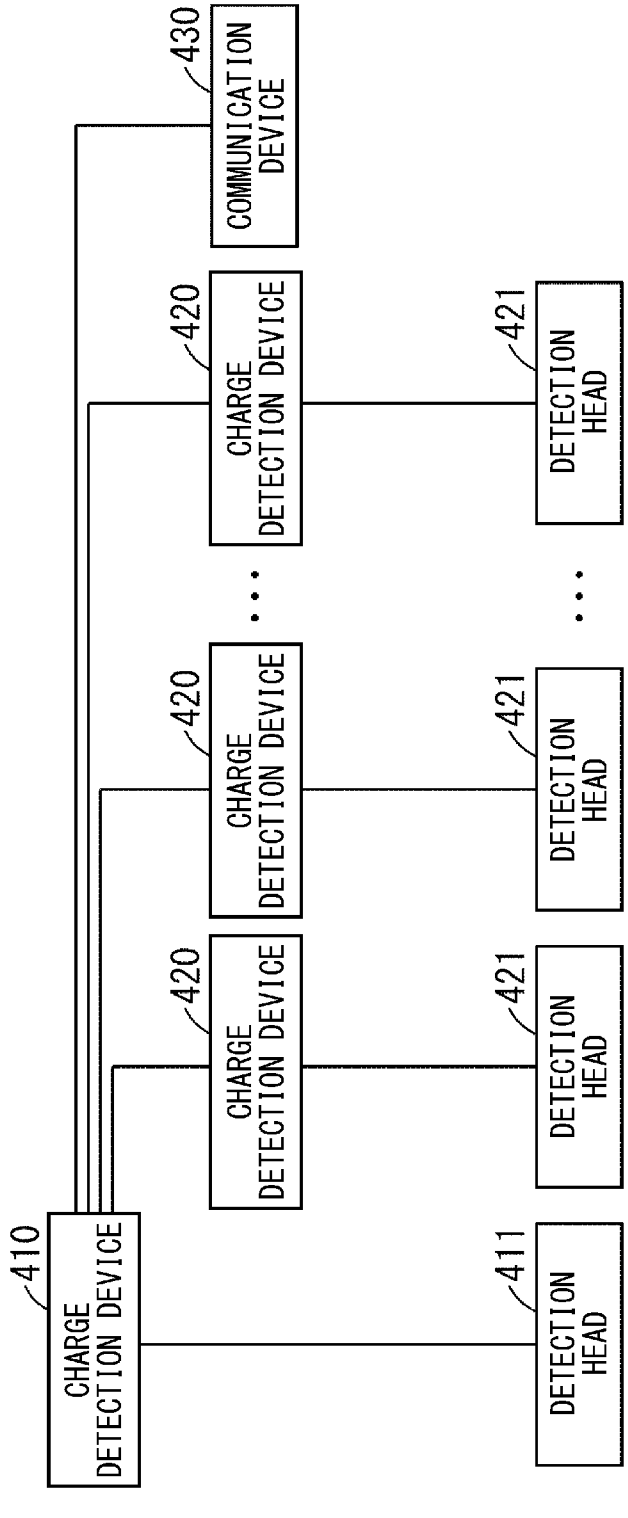
FIG. 2

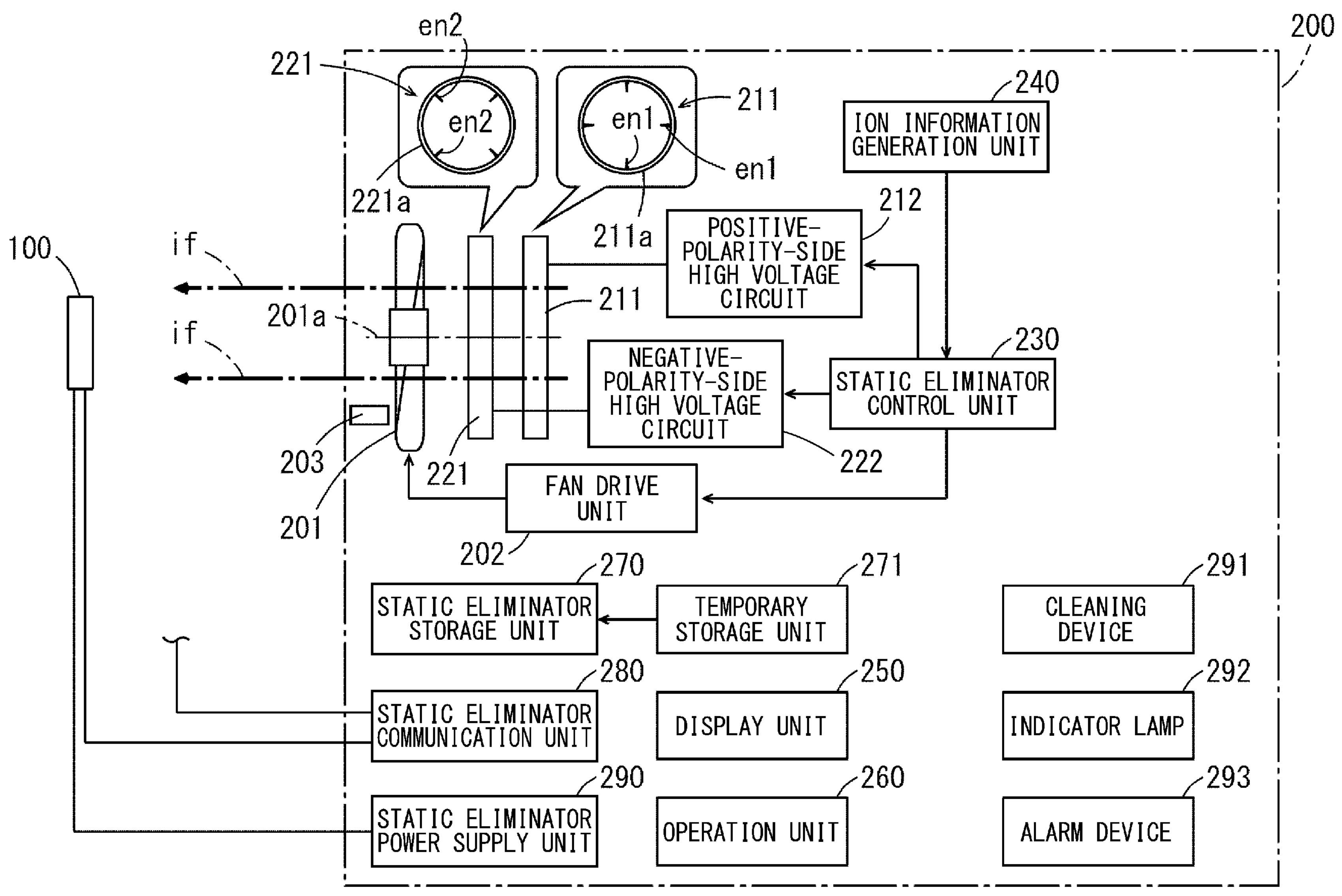

FIG. 5
200
221
en2
221a
211
en1
211a
240
ION INFORMATION GENERATION UNIT
212
POSITIVE-POLARITY-SIDE HIGH VOLTAGE CIRCUIT
230
STATIC ELIMINATOR CONTROL UNIT
222
NEGATIVE-POLARITY-SIDE HIGH VOLTAGE CIRCUIT
100
if
201a
203
201
202
FAN DRIVE UNIT
270
STATIC ELIMINATOR STORAGE UNIT
271
TEMPORARY STORAGE UNIT
291
CLEANING DEVICE
280
STATIC ELIMINATOR COMMUNICATION UNIT
250
DISPLAY UNIT
292
INDICATOR LAMP
290
STATIC ELIMINATOR POWER SUPPLY UNIT
260
OPERATION UNIT
293
ALARM DEVICE

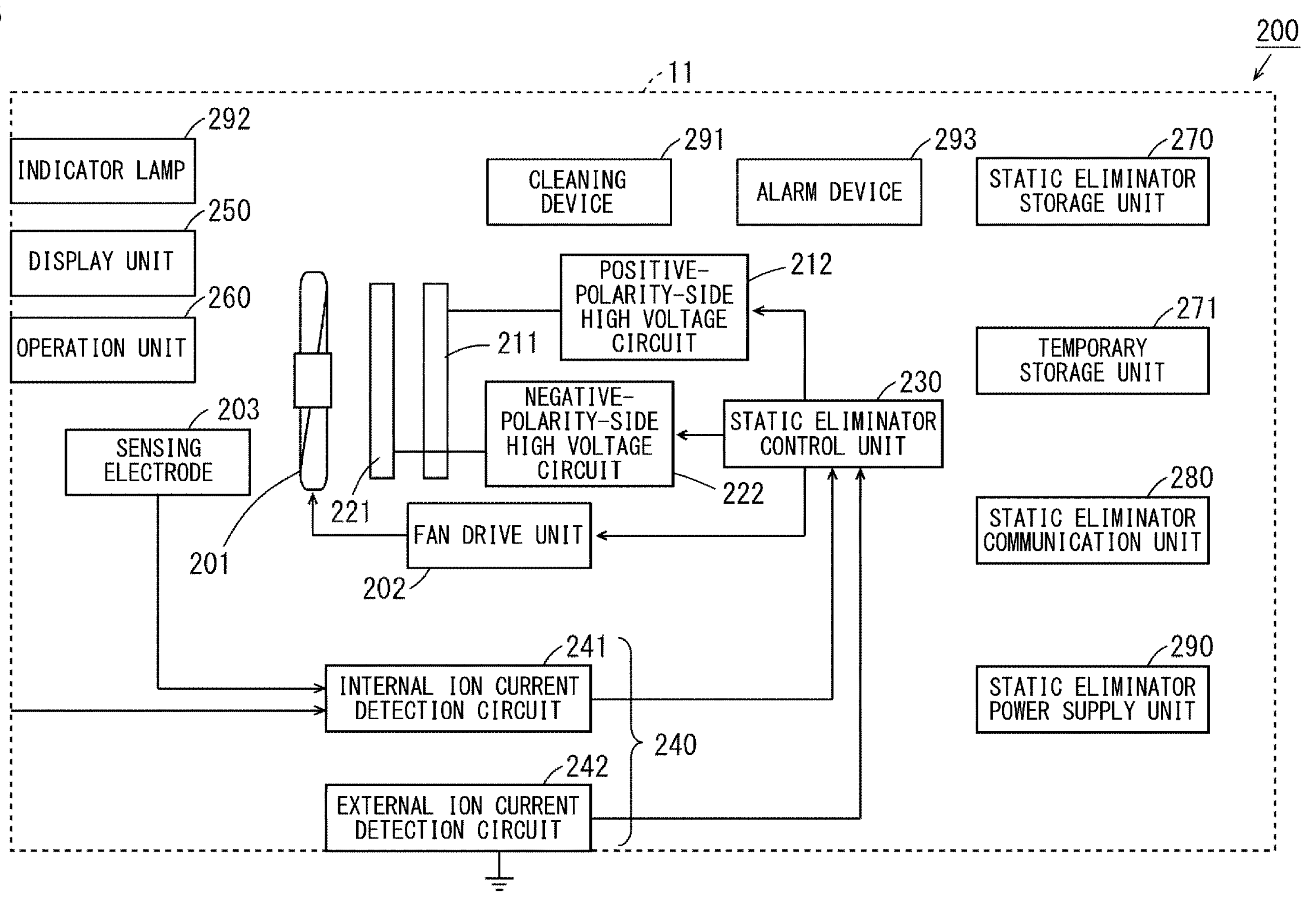
FIG. 6
200
11
INDICATOR LAMP
292
DISPLAY UNIT
250
OPERATION UNIT
260
CLEANING DEVICE
291
ALARM DEVICE
293
STATIC ELIMINATOR STORAGE UNIT
270
POSITIVE-POLARITY-SIDE HIGH VOLTAGE CIRCUIT
212
211
TEMPORARY STORAGE UNIT
271
NEGATIVE-POLARITY-SIDE HIGH VOLTAGE CIRCUIT
222
STATIC ELIMINATOR CONTROL UNIT
230
SENSING ELECTRODE
203
221
201
FAN DRIVE UNIT
202
STATIC ELIMINATOR COMMUNICATION UNIT
280
INTERNAL ION CURRENT DETECTION CIRCUIT
241
240
EXTERNAL ION CURRENT DETECTION CIRCUIT
242
STATIC ELIMINATOR POWER SUPPLY UNIT
290

AIR VOLUME ADJUSTMENT SCREEN
510
FIRST MONITOR SCREEN
520
SECOND MONITOR SCREEN
530
FIRST EVENT HISTORY SCREEN
540
SECOND EVENT HISTORY SCREEN
550
THIRD EVENT HISTORY SCREEN
560
250
500
263
264

FIG. 14
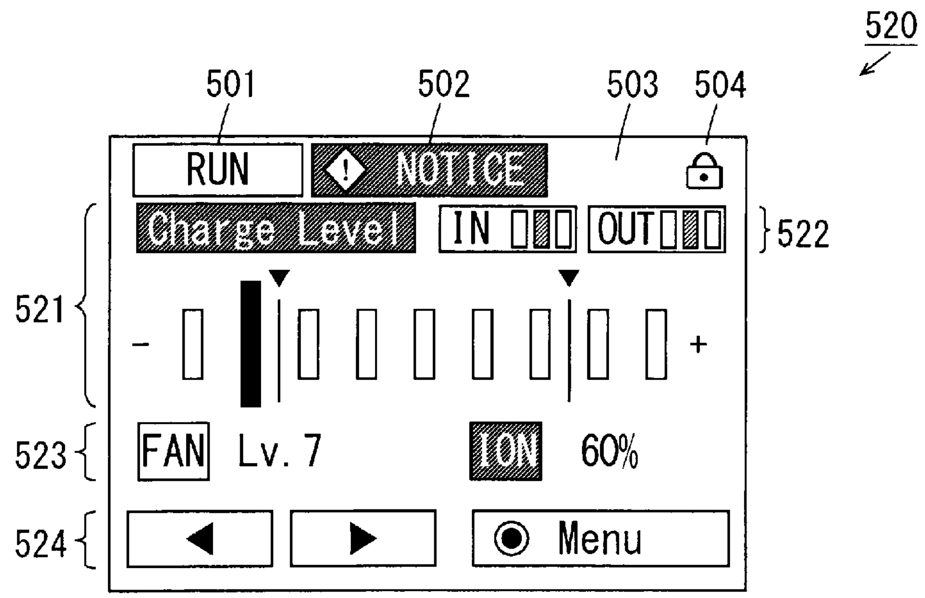
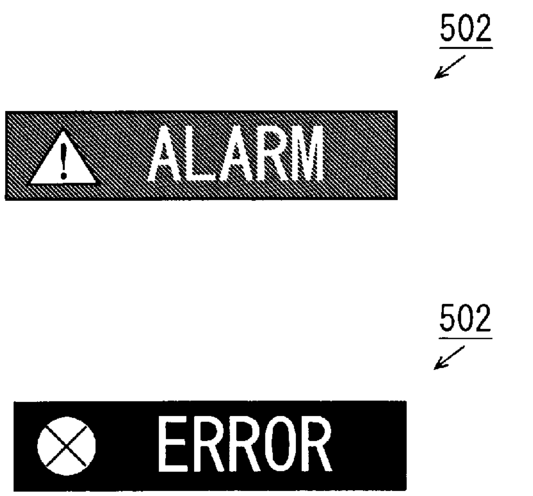

620

Air Volume Level 1 (MIN)

2

3

4

5

▼ ▲ ◉ OK

FIG. 24
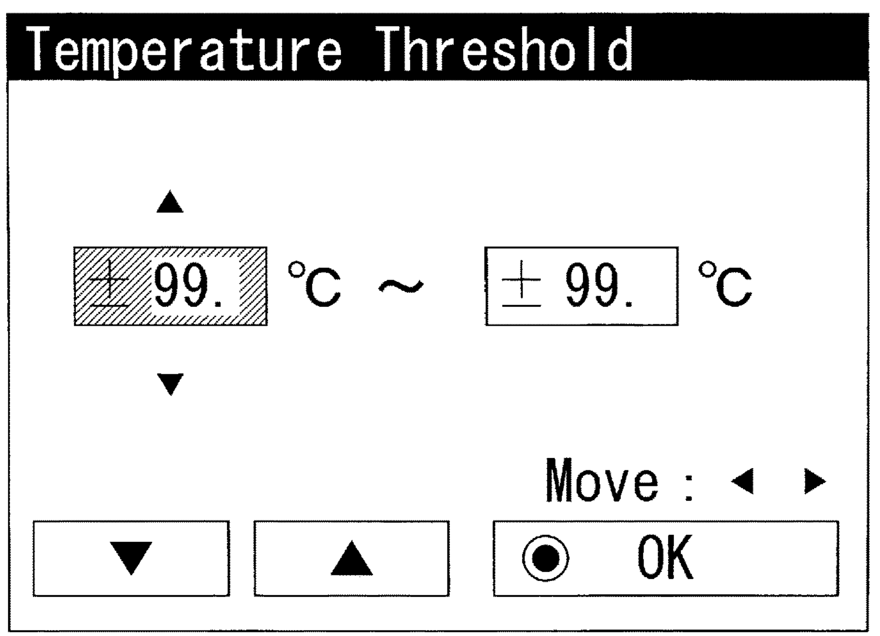
FIG. 25
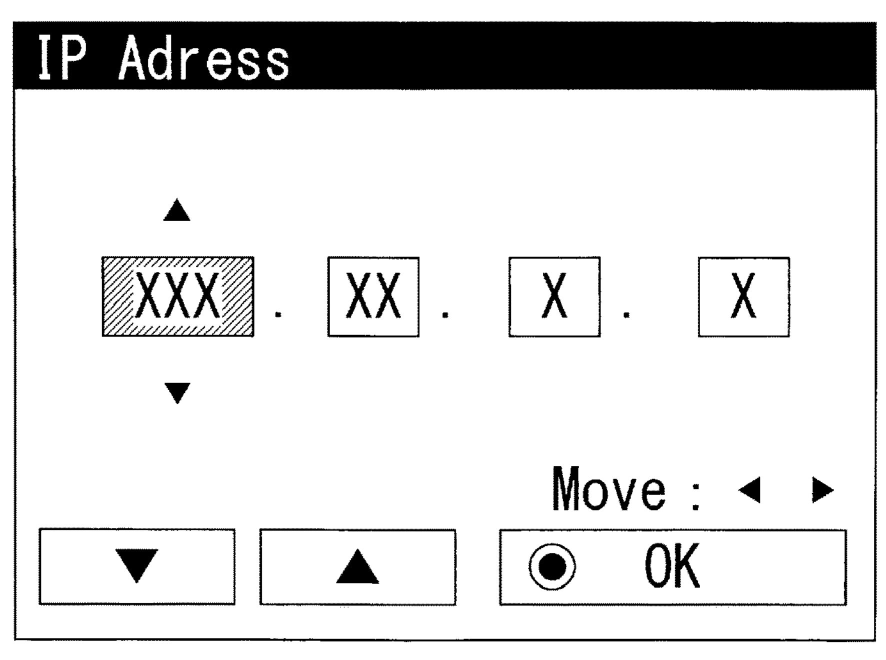

FIG. 27

| DATE AND TIME | OCCURRING EVENT | STATE | PRESENCE OR ABSENCE OF STATIC ELIMINATION | ION BALANCE [V] | IB THRESHOLD UPPER LIMIT [V] | IB THRESHOLD LOWER LIMIT [V] | TEMPERATURE [°C] | TEMPERATURE THRESHOLD UPPER LIMIT [°C] | TEMPERATURE THRESHOLD LOWER LIMIT [°C] | HUMIDITY [%] | HUMIDITY THRESHOLD UPPER LIMIT [%] | HUMIDITY THRESHOLD LOWER LIMIT [%] | CHARGE AMOUNT [Lv] | CHARGE AMOUNT THRESHOLD | FAN ROTATIONAL SPEED [rpm] | AMOUNT OF IONS [%] | ION LEVEL THRESHOLD |
|---|---|---|---|---|---|---|---|---|---|---|---|---|---|---|---|---|---|
| 2022/3/24 9:00:02 | STATIC ELIMINATION START | NORMAL | ○ | — | — | — | — | — | — | — | — | — | — | — | — | — | — |
| 2022/3/24 9:15:12 | STATIC ELIMINATION STOP | STOP | × | — | — | — | — | — | — | — | — | — | — | — | — | — | — |
| 2022/3/24 9:15:31 | CLEANING START | STOP | × | — | — | — | — | — | — | — | — | — | — | — | — | — | — |
| 2022/3/24 9:15:54 | CLEANING END | STOP | × | — | — | — | — | — | — | — | — | — | — | — | — | — | — |
| 2022/3/24 9:15:59 | STATIC ELIMINATION START | NORMAL | ○ | — | — | — | — | — | — | — | — | — | — | — | — | — | — |
| 2022/3/24 12:30:35 | CHARGED OBJECT SENSING START | DETERMINATION OUTPUT | ○ | 7.4 | 10 | -10 | 26 | 30 | 20 | 44 | 60 | 30 | 6 | HIGH | 1400 | 100 | LOW |
| 2022/3/24 12:35:41 | IB DETERMINATION OUTPUT START | DETERMINATION OUTPUT | ○ | 10.7 | 10 | -10 | 26 | 30 | 20 | 44 | 60 | 30 | 3 | HIGH | 1400 | 100 | LOW |
| 2022/3/24 12:36:01 | IB DETERMINATION OUTPUT END | DETERMINATION OUTPUT | ○ | 9.8 | 10 | -10 | 26 | 30 | 20 | 44 | 60 | 30 | 3 | HIGH | 1400 | 100 | LOW |
| 2022/3/24 12:37:24 | CHARGED OBJECT SENSING END | NORMAL | ○ | 8.9 | 10 | -10 | 26 | 30 | 20 | 44 | 60 | 30 | 3 | HIGH | 1400 | 100 | LOW |

STATIC ELIMINATOR AND STATIC ELIMINATION SYSTEM

CROSS-REFERENCE TO RELATED APPLICATIONS

The present application claims foreign priority based on Japanese Patent Application No. 2022-142585, filed Sep. 7, 2022, and No. 2022-177303, filed Nov. 4, 2022, the contents of which are incorporated herein by references.

BACKGROUND OF THE INVENTION

1. Field of the Invention

The invention relates to a static eliminator and a static elimination system for eliminating static electricity from a static elimination target.

2. Description of Related Art

In manufacturing lines of a semiconductor device, a liquid crystal display device, or the like, when each of parts to be used for manufacturing is charged, a product yield is likely to decrease due to occurrence of electrostatic breakdown or foreign matter adhering to the part. In order to suppress the decrease in the yield caused by charging of each of the parts, a static eliminator is used.

In a static elimination device (static eliminator) described in JP H10-289796 A, positive ions and negative ions generated from an electrode needle are blown to a target object by a fan. Further, in the static elimination device, output voltages of the positive and negative high voltage generation circuit connected to the electrode needle are controlled by a signal of a detection resistor connected to a ground line such that ion balance is maintained.

As a result, an electric charge accumulated in an object to be neutralized is removed.

In recent years, there has been a demand for to strict management of manufacturing statuses including a static elimination status and the like of products in the manufacturing lines. However, a burden accompanying the management increases if the manufacturing statuses of products are strictly managed.

SUMMARY OF THE INVENTION

An object of the invention is to provide a static eliminator and a static elimination system capable of strictly managing a manufacturing status of a product without increasing a management burden.

According to one embodiment of the invention, a static eliminator includes: an ion generation unit that generates ions; an ion control unit that controls the ion generation unit; a measurement value acquisition unit that acquires a measurement value related to the control by the ion control unit and acquires a measurement time at which the measurement value has been acquired; a data generation unit that generates history data based on the measurement value and the measurement time; and a nonvolatile storage unit that stores the history data.

According to another embodiment of the invention, a static elimination system includes the static eliminator described above and a control device connectable to the static eliminator, the static eliminator further including a first communication unit connected to a network, and the control device including a second communication unit connected to the network, and a data acquisition unit that acquires the history data stored in the nonvolatile storage unit via the network.

According to the invention, the manufacturing status of the product can be strictly managed without increasing the management burden.

BRIEF DESCRIPTION OF THE DRAWINGS

FIG. 2 is a block diagram illustrating a simple configuration of a charge detection system;

FIG. 5 is a block diagram for describing a configuration of a static eliminator of FIG. 1;

FIG. 6 is a block diagram for describing the configuration of the static eliminator of FIG. 1;

FIG. 14 is a view for describing details of an event display area;

FIG. 24 is a view illustrating a fourth example of the setting screen;

FIG. 25 is a view illustrating a fifth example of the setting screen;

FIG. 27 is a view illustrating an example of a history image;

DETAILED DESCRIPTION OF PREFERRED EMBODIMENTS

Figure 1:
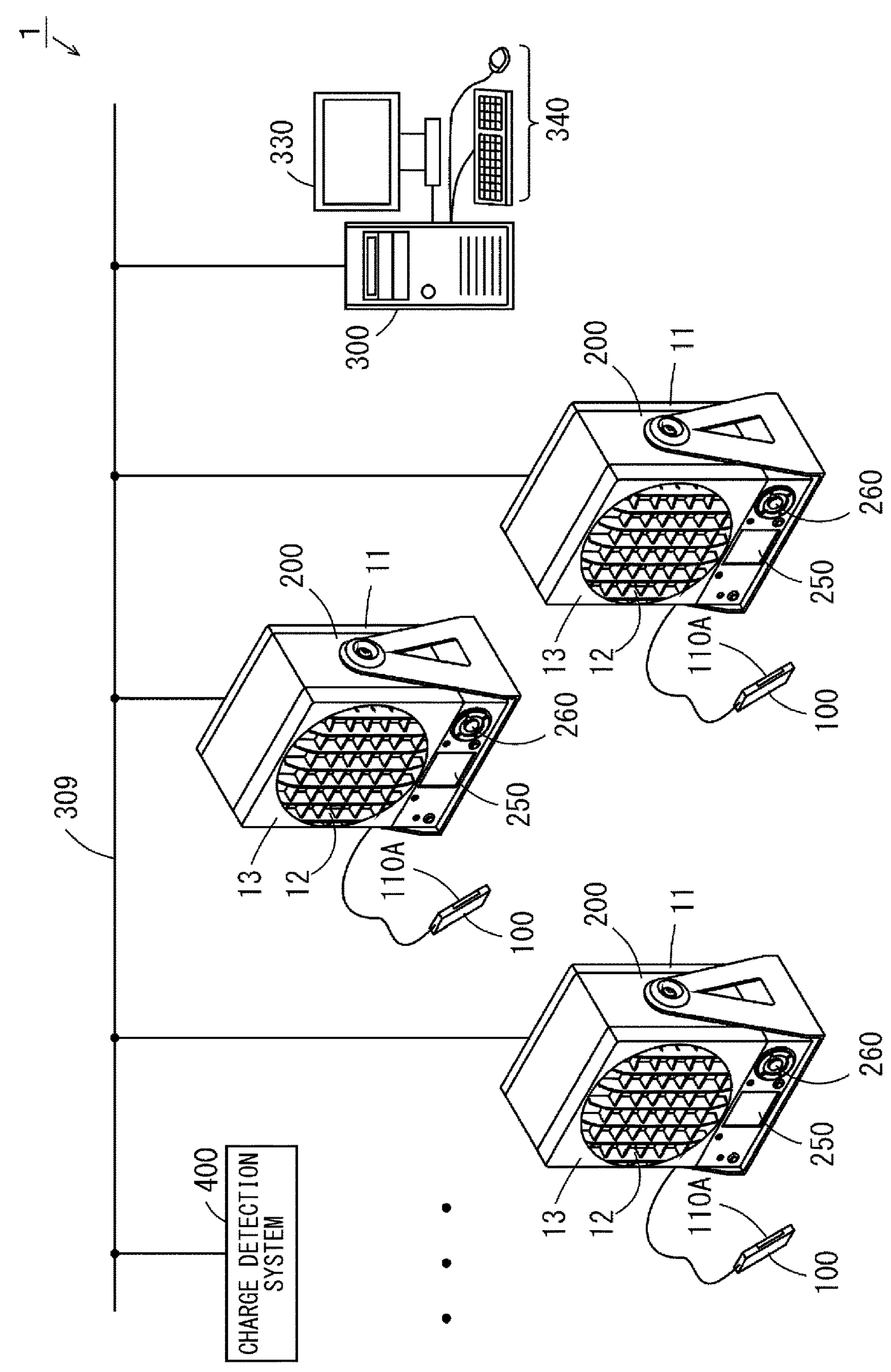
FIG. 1 is a diagram for describing an outline of a configuration of a static elimination system according to one embodiment of the invention.

1. Outline of Configuration of Static Elimination System and Use Examples Thereof Hereinafter, a static eliminator and a static elimination system according to one embodiment of the invention will be described with reference to the drawings. FIG. 1 is a diagram for describing an outline of a configuration of the static elimination system according to one embodiment of the invention. As illustrated in FIG. 1, a static elimination system 1 according to the present embodiment mainly includes a plurality of static eliminators 200 and a control device 300. The plurality of static eliminators 200 and the control device 300 are connected to a network 309 in a wired or wireless manner, and can communicate with each other. The static elimination system 1 may further include a charge detection system 400. In this case, the charge detection system 400 is connected to the network 309 in a wired or wireless manner. The network 309 is a communication line network such as a local area network (LAN), a wide area network (WAN), or the Internet. In the present embodiment, the number of the plurality of static eliminators 200 connected to the network 309 is 50, 100, 1000, or the like.

The static eliminator 200 includes a static eliminator housing 11, and has a configuration in which various high voltage circuits and the like for generating positive ions and negative ions are accommodated in the static eliminator housing 11. An air outlet 12 is formed in the static eliminator housing 11. A cover 13 may be attached to the static eliminator housing 11 so as to cover the front of a fan 201 to be described later. In this case, the air outlet 12 is formed in the cover 13. Further, the static eliminator housing 11 may be provided with a cover detection sensor that detects that the cover 13 is attached to an attachment portion of the cover 13. The static eliminator 200 sends out positive ions and negative ions generated inside the static eliminator housing 11 to the outside of the static eliminator 200 through the air outlet 12.

In the following description, a gas (in this example, air containing the positive ions and the negative ions) flowing from the air outlet 12 of the static eliminator housing 11 to the outside of the static eliminator 200 is referred to as a static elimination gas. The cover 13 may function as a louver that adjusts a diffusion angle of the static elimination gas. Further, a space to which the static elimination gas sent out from the static eliminator 200 is to be supplied, that is, a static elimination target space in which static elimination of an object is to be performed is referred to as a target space. A plurality of belt conveyors may be prepared, a plurality of objects may be sequentially conveyed at a constant speed by each of the belt conveyors, and static elimination of each of the objects may be performed in a predetermined space on each of the belt conveyors. In this case, the space on each of the belt conveyors is the target space.

If there is a bias in ion balance in the target space, it is difficult to eliminate static electricity of the object. Therefore, in order to detect the ion balance in the target space, an ion balance sensor 100 is connected to each of the plurality of static eliminators 200. The ion balance sensor 100 connected to each of the static eliminators 200 is provided in the target space corresponding to each of the static eliminators 200. In the present embodiment, the ion balance in the target space is a degree of the bias of an electrical polarity in the target space.

The ion balance in the target space approaches zero, for example, in a case where the amount of positive ions and the amount of negative ions contained in the static elimination gas flowing from the static eliminator 200 to the target space are equal or substantially equal. On the other hand, the ion balance in the target space deviates (is biased) from zero, for example, due to a difference between the amount of positive ions and the amount of negative ions contained in the static elimination gas flowing from the static eliminator 200 to the target space. The ion balance sensor 100 includes a detection plate 110A having a conductivity. The ion balance in the target space is detected based on a potential of the detection plate 110A. Details of the ion balance sensor 100 will be described later.

Since the ion balance sensor 100 according to the present embodiment is provided in the target space, it is possible to detect information regarding an environment of the target space in addition to the ion balance in the target space. Specifically, the ion balance sensor 100 can detect the amount of ions flowing in the target space per unit time period (hereinafter, referred to as an ion current of the target space) as the information regarding the environment of the target space. Furthermore, the ion balance sensor 100 can detect the temperature and the humidity of the target space as the information regarding the environment of the target space.

The ion balance sensor 100 is connected to the static eliminator 200 via a cable. Various types of the information detected by the ion balance sensor 100 are transmitted to the static eliminator 200 through the cable. In this case, the static eliminator 200 can adjust a positive ion generation state and a negative ion generation state in the static eliminator 200 based on a detection result of the ion balance in the target space. As a result, a static elimination gas suitable for eliminating the static electricity of the object is supplied to the target space.

Here, when the air outlet 12 of the static eliminator 200 faces a position shifted from the target space, the static elimination gas does not flow from the static eliminator 200 to the target space. In this case, the ion current is detected as zero or a value close to zero. On the other hand, when the air outlet 12 of the static eliminator 200 faces the target space, the static elimination gas appropriately flows from the static eliminator 200 to the target space. In this case, the ion current is detected as a value corresponding to the amount of ions contained in the static elimination gas.

Therefore, the static eliminator 200 can determine whether or not a position and a posture (an installation state) of the static eliminator 200 are appropriate based on a detection result of the ion current. Specifically, when the value of the ion current is equal to or less than a predetermined ion current threshold, it can be determined that the installation state of the static eliminator 200 is abnormal. Further, when the value of the ion current is more than the ion current threshold, it can be determined that the installation state of the static eliminator 200 is normal. When such a determination result is presented to a user, the user can easily grasp the necessity of adjustment of the installation state of the static eliminator 200.

Furthermore, the static eliminator 200 can manage a change in an environmental state of the target space by storing detection results of the temperature and the humidity of the target space in a memory.

The control device 300 is, for example, a personal computer, and includes, for example, a central processing unit (CPU), a read only memory (ROM), and a random access memory (RAM). A main body display unit 330 and a main body operation unit 340 are connected to the control device 300. The main body display unit 330 is configured using a liquid crystal display (LCD) panel or an organic electroluminescence (EL) panel. The main body operation unit 340 includes a keyboard and a pointing device, and is configured to be operable by the user.

The control device 300 is used to set various operation conditions for the plurality of static eliminators 200, monitor operation states of the plurality of static eliminators 200, and the like. The plurality of operation conditions of the static eliminator 200 include a flow rate (air volume) of a gas sent to the target space by the fan, which will be described later, of the static eliminator 200, various thresholds for determining whether the static eliminator 200 is in a normal state or an abnormal state, whether or not to disable an operation of an operation unit 260, which will be described later, in the static eliminator 200, and the like. The control device 300 may be used to monitor a charge amount detected by the charge detection system 400.

2. Configuration of Charge Detection System

FIG. 2 is a block diagram illustrating a simple configuration of the charge detection system 400. As illustrated in FIG. 2, the charge detection system 400 includes a charge detection device 410, a plurality of charge detection devices 420, and a communication device 430. Each of the charge detection device 410, the plurality of charge detection devices 420, and the communication device 430 includes a CPU and has a communication function.

A detection head 411 is connected to the charge detection device 410. The detection head 411 is arranged in a space on the downstream side of a target space on any of the belt conveyors. The detection head 411 detects a charge amount of the space in which the detection head 411 is arranged according to control by the charge detection device 410. Further, the detection head 411 gives the detected charge amount to the charge detection device 410. As a result, the charge detection device 410 acquires the charge amount detected by the detection head 411.

A plurality of detection heads 421 are connected to the plurality of charge detection devices 420, respectively. Each of the plurality of detection heads 421 is arranged in a space on the downstream side of a target space on each of a plurality of the other belt conveyors. Each of the detection heads 421 detects a charge amount of the space in which the detection head 421 is arranged according to control by the corresponding charge detection device 420. Further, each of the detection heads 421 gives the detected charge amount to the corresponding charge detection device 420. As a result, each of the charge detection devices 420 acquires the charge amount detected by the corresponding detection head 421.

The charge detection device 410 acquires the charge amount acquired by each of the charge detection devices 420 from each of the charge detection devices 420. The communication device 430 performs communication protocol conversion between the charge detection device 410 and the control device 300 to transmit the charge amount acquired by the charge detection device 410 to the control device 300.

According to this configuration, static elimination is performed in the target space on each of the belt conveyors, and a charge amount of an object conveyed downstream is detected by any one of the detection head 411 and the plurality of detection heads 421. As a result, the control device 300 can monitor whether or not the static elimination of the object has been appropriately performed.

3. Basic Configuration of Ion Balance Sensor

Figure 3:
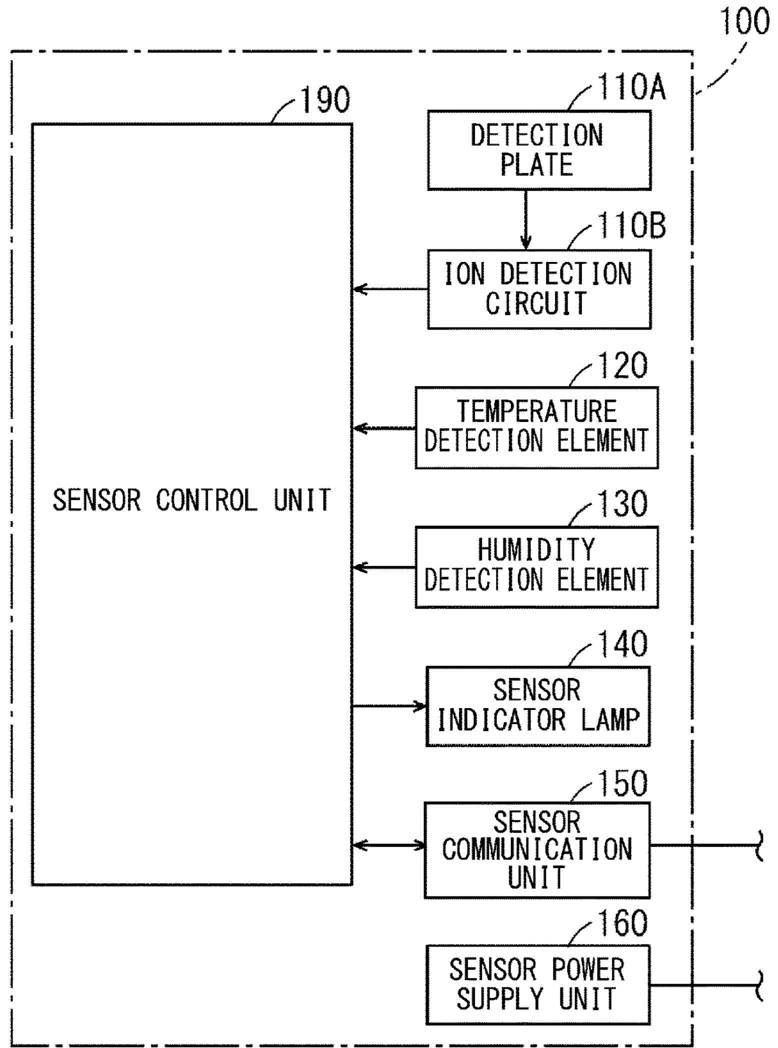
FIG. 3 is a block diagram for describing a configuration of an ion balance sensor of FIG. 1.

FIG. 3 is a block diagram for describing a configuration of the ion balance sensor 100 of FIG. 1. As illustrated in FIG. 3, the ion balance sensor 100 includes a detection plate 110A, an ion detection circuit 110B, a temperature detection element 120, a humidity detection element 130, a sensor indicator lamp 140, a sensor communication unit 150, a sensor power supply unit 160, and a sensor control unit 190.

The detection plate 110A is made of a conductive material (for example, a metal material), and is provided so as to be exposed in a space surrounding the ion balance sensor 100. The ion detection circuit 110B is connected to the detection plate 110A, and outputs a signal corresponding to ion balance and an ion current in a target space based on a temporal change in a potential of the detection plate 110A. A specific configuration of the ion detection circuit 110B will be described later.

The temperature detection element 120 is an element that outputs a signal corresponding to a temperature of a space in which the temperature detection element 120 is arranged, and is, for example, a thermocouple or a resistance temperature detector. Since the ion balance sensor 100 is configured such that the space in which the temperature detection element 120 is arranged communicates with the space surrounding the ion balance sensor 100, the temperature detection element 120 outputs a signal corresponding to the temperature of the space (target space) surrounding the ion balance sensor 100. The humidity detection element 130 is, for example, a polymer humidity detection element, and outputs a signal corresponding to the humidity of the space (target space) surrounding the ion balance sensor 100.

The sensor indicator lamp 140 includes, for example, a plurality of light emitting diodes that emit light in different colors. The sensor communication unit 150 transmits various signals output from the sensor control unit 190 to the static eliminator 200 via the cable. Further, the sensor communication unit 150 receives various types of information transmitted from the static eliminator 200 via the cable and gives the information to the sensor control unit 190.

The sensor power supply unit 160 receives power supplied from the static eliminator 200 via the cable, appropriately converts the received power, and supplies the converted power to each of constituent elements of the ion balance sensor 100.

The sensor control unit 190 includes a microcomputer, and generates various types of information and controls each of the constituent elements. Note that the sensor control unit 190 may include a CPU and a memory instead of the microcomputer. The microcomputer or the memory of the sensor control unit 190 mainly stores a program configured to detect the ion balance, the ion current, the temperature, and the humidity of the target space, and to transmit and receive various types of information to and from the static eliminator 200.

In the sensor control unit 190, the microcomputer or the CPU executes the program stored in the sensor control unit 190. As a result, the sensor control unit 190 detects the ion balance in the target space based on the signal output from the ion detection circuit 110B, and generates a signal indicating a detection result as an ion balance signal. The generated ion balance signal is output from the sensor control unit 190.

Further, the sensor control unit 190 detects the ion current in the target space based on the signal output from the ion detection circuit 110B, and generates a signal indicating a detection result as an ion current signal. The generated ion current signal is output from the sensor control unit 190.

Further, the sensor control unit 190 detects the temperature of the target space based on the signal output from the temperature detection element 120, and generates a signal indicating a detection result as a temperature signal. The generated temperature signal is output from the sensor control unit 190.

Further, the sensor control unit 190 detects the humidity of the target space based on the signal output from the humidity detection element 130, and generates a signal indicating a detection result as a humidity signal. The generated humidity signal is output from the sensor control unit 190.

Furthermore, for example, in a case where the ion balance and the ion current detected by the ion balance sensor 100 satisfy a predetermined allowable condition, the sensor control unit 190 controls the sensor indicator lamp 140 to emit light in a specific color (for example, green). On the other hand, for example, in a case where the ion balance and the ion current detected by the ion balance sensor 100 do not satisfy the above-described allowable condition, the sensor control unit 190 controls the sensor indicator lamp 140 to emit light in a specific other color (for example, red).

Figure 4:
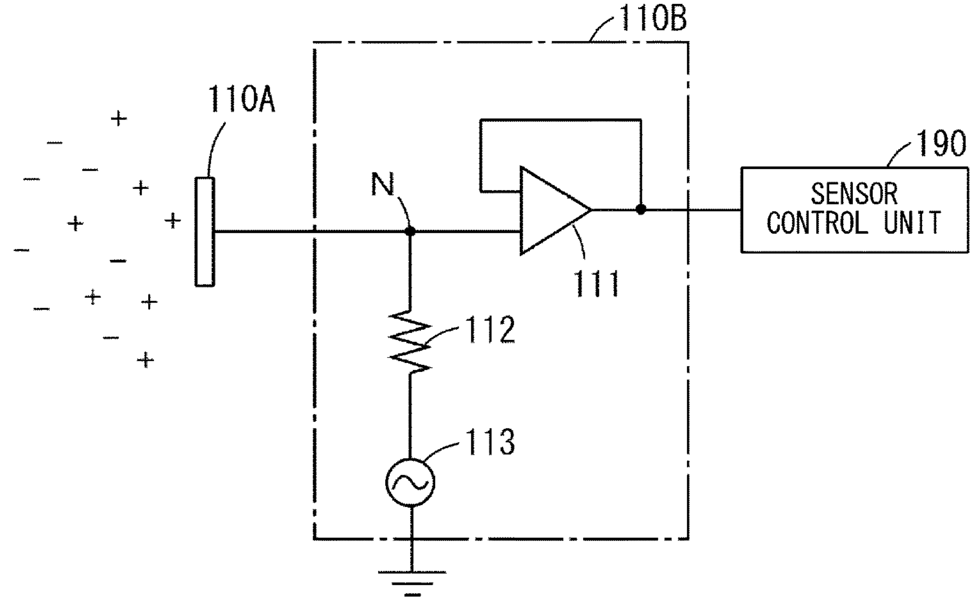
FIG. 4 is a circuit diagram illustrating an example of a specific configuration of an ion detection circuit.

FIG. 4 is a circuit diagram illustrating an example of a specific configuration of the ion detection circuit 110B. As illustrated in FIG. 4, the ion detection circuit 110B includes an operational amplifier 111, a fixed resistor 112, and a modulation voltage source 113. The operational amplifier 111 is used as a buffer circuit, and a non-inverting input terminal of the operational amplifier 111 is electrically connected to the detection plate 110A. Further, an output terminal of the operational amplifier 111 is connected to an inverting input terminal of the operational amplifier 111 and is connected to the sensor control unit 190.

The modulation voltage source 113 generates an alternating-current voltage as a modulation voltage having periodicity. The modulation voltage source 113 is electrically connected to a node N between the detection plate 110A and a non-inverting input terminal of the operational amplifier 111 via the fixed resistor 112.

As described above, the detection plate 110A is provided so as to be exposed in the space (target space in this example) surrounding the ion balance sensor 100. Further, the static elimination gas containing positive ions and negative ions flows from the static eliminator 200 into the target space of this example.

In the ion balance sensor 100, in a state where the modulation voltage source 113 generates an AC voltage, s magnitude of an amplitude of a voltage waveform of a signal (voltage signal) output from the operational amplifier 111 or a value corresponding thereto is detected as the ion current in the target space. Further, a value of a fluctuation center of the voltage waveform of the signal (voltage signal) output from the operational amplifier 111 or a value corresponding thereto is detected as the ion balance in the target space.

4. Basic Configuration of Static Eliminator

FIGS. 5 and 6 are block diagrams for describing the configuration of the static eliminator 200 in FIG. 1. As illustrated in FIGS. 5 and 6, the static eliminator 200 includes a fan 201, a fan drive unit 202, a sensing electrode 203, a positive ion generation unit 211, a positive-polarity-side high voltage circuit 212, a negative ion generation unit 221, a negative-polarity-side high voltage circuit 222, a static eliminator control unit 230, and an ion information generation unit 240. These constituent elements are accommodated in the static eliminator housing 11 of FIG. 1. Further, the static eliminator 200 is provided with a surface electrometer that detects a charge amount of an object. A charged object can be sensed based on the charge amount detected by the surface electrometer.

In FIG. 5, schematic front views of the positive ion generation unit 211 and the negative ion generation unit 221 are illustrated in balloons. The positive ion generation unit 211 includes an annular member 211*a* and a plurality of (four in this example) electrode needles en1. The plurality of electrode needles en1 are provided at equal intervals on an inner peripheral portion of the annular member 211*a* so as to extend toward the center of the annular member 211*a*. Similarly to the positive ion generation unit 211, the negative ion generation unit 221 includes an annular member 221*a* and a plurality of electrode needles en2. The plurality of electrode needles en2 are provided at equal intervals on the inner peripheral portion of the annular member 221*a* so as to extend toward the center of the annular member 221*a*.

The positive-polarity-side high voltage circuit 212 is connected to the positive ion generation unit 211. The positive-polarity-side high voltage circuit 212 includes a resistor and a booster circuit, and applies a high voltage to the plurality of electrode needles en1 of the positive ion generation unit 211 under the control of the static eliminator control unit 230. As a result, a corona discharge is generated thereby generating positive ions. The negative-polarity-side high voltage circuit 222 is connected to the negative ion generation unit 221. The negative-polarity-side high voltage circuit 222 includes a resistor and a booster circuit, and applies a high voltage to the plurality of electrode needles en2 of the negative ion generation unit 221 under the control of the static eliminator control unit 230. As a result, a corona discharge is generated thereby generating negative ions.

The fan 201 is provided inside the static eliminator housing 11 of FIG. 1 so as to face the air outlet 12 and to be rotatable about a predetermined rotating shaft 201*a*. The fan drive unit 202 includes, for example, a motor, and rotates the fan 201 about the rotating shaft 201*a* under the control of the static eliminator control unit 230.

The fan 201, the negative ion generation unit 221, and the positive ion generation unit 211 are arranged side by side in this order in a direction of the rotating shaft 201*a* of the fan 201 from the air outlet 12 of FIG. 1. The annular members 211*a* and 221*a* of the positive ion generation unit 211 and the negative ion generation unit 221 have centers located on the rotating shaft 201*a* of the fan 201.

As the positive-polarity-side high voltage circuit 212 and the negative-polarity-side high voltage circuit 222 are operated, the positive ion generation unit 211 and the negative ion generation unit 221 generate positive ions and negative ions, respectively. In this state, the fan 201 rotates. As a result, the static elimination gas containing the positive ions and negative ions flows to the outside of the static eliminator 200 through the air outlet 12 of the static eliminator housing 11. In FIG. 5, the flow of the static elimination gas flowing from the air outlet 12 of the static eliminator housing 11 to the outside of the static eliminator 200 is indicated by a plurality of thick dashed-dotted arrows if. The sensing electrode 203 is arranged on a flow path of the static elimination gas sent by the fan 201. The ion current caused by the static elimination gas flows through the sensing electrode 203.

The ion information generation unit 240 detects the overall ion balance between the positive ions and the negative ions generated in the static eliminator 200 as ion information. The ion information is information used when the static eliminator control unit 230 controls the positive-polarity-side high voltage circuit 212 or the negative-polarity-side high voltage circuit 222. The ion information may include ion balance of the static elimination gas flowing through the air outlet 12 of the static eliminator 200, which is different from the ion balance in the target space detected by the ion balance sensor 100. Further, the ion information may include ion balance in the target space and the space surrounding the static eliminator 200. Therefore, the ion information is generated based on detection results, for example, obtained by detecting the ion balance of the static elimination gas flowing in the vicinity of the fan 201 and detecting the ion balance in the target space and the space surrounding the static eliminator 200.

In this example, the ion information generation unit 240 includes an internal ion current detection circuit 241 and an external ion current detection circuit 242 as illustrated in FIG. 6. The internal ion current detection circuit 241 is connected to the sensing electrode 203 and is connected to the static eliminator housing 11. The internal ion current detection circuit 241 detects an ion current flowing through the sensing electrode 203 and an ion current flowing on a surface of the static eliminator housing 11 as internal ion currents. The external ion current detection circuit 242 is connected to a ground electrode maintained at a ground potential. The external ion current detection circuit 242 detects, as an external ion current, an ion current returning from the target space to the static eliminator 200 via a ground. As the internal ion currents and the external ion current are detected, the amount of ions generated by each of the positive ion generation unit 211 and the negative ion generation unit 221 is measured.

The static eliminator control unit 230 includes a CPU and a memory or a microcomputer. The static eliminator control unit 230 controls the fan drive unit 202 such that the static elimination gas flows in a preset air volume at the time of static elimination of the object by the static eliminator 200. Further, the static eliminator control unit 230 controls the positive-polarity-side high voltage circuit 212 and the negative-polarity-side high voltage circuit 222 such that the ion balance of the static elimination gas approaches zero based on the ion information generated by the ion information generation unit 240.

The static eliminator 200 may be configured to be operable in an eco-mode. In the eco-mode, the above-described static elimination is performed in a state where power consumption is as small as possible. For example, in the eco-mode, the static elimination may be performed in a state where an air volume of the fan 201 is the smallest (Air volume level "1" to be described later).

In addition to the above constituent elements (201, 202, 211, 212, 221, 222, 230, and 240), the static eliminator 200 further includes a display unit 250, an operation unit 260, a static eliminator storage unit 270, a temporary storage unit 271, a static eliminator communication unit 280, a static eliminator power supply unit 290, a cleaning device 291, an indicator lamp 292, and an alarm device 293. The display unit 250, the operation unit 260, and the indicator lamp 292 are attached to a part of the static eliminator housing 11. The static eliminator storage unit 270, the temporary storage unit 271, the static eliminator communication unit 280, the static eliminator power supply unit 290, the cleaning device 291, and the alarm device 293 are accommodated in the static eliminator housing 11.

Figure 7:
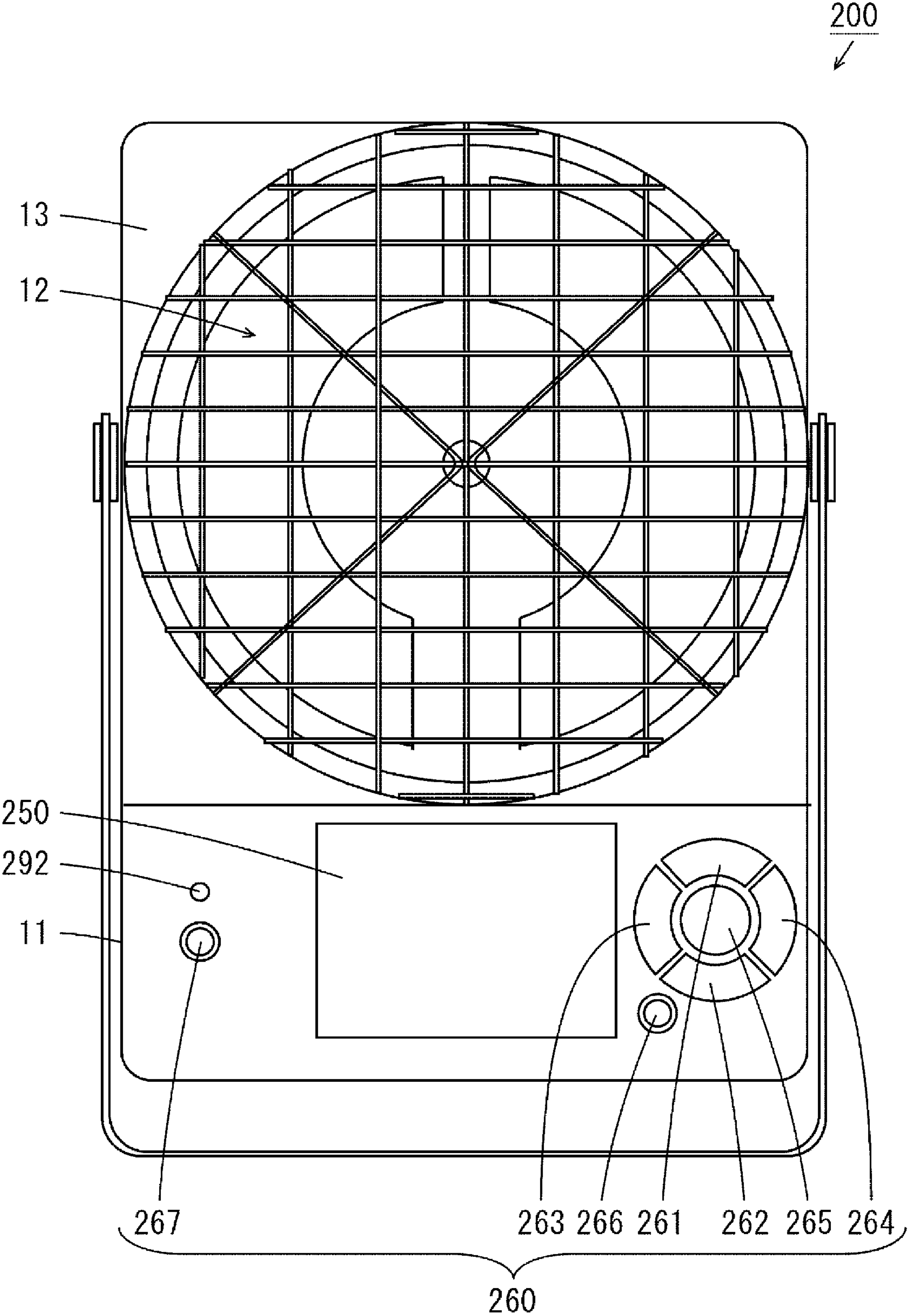
FIG. 7 is a view illustrating an example of arrangement of a display unit, an operation unit, and an indicator lamp.

FIG. 7 is a view illustrating an example of arrangement of the display unit 250, the operation unit 260, and the indicator lamp 292. As illustrated in FIG. 7, the display unit 250 is arranged in a central area in a lower portion of a front surface of the static eliminator housing 11. The display unit 250 includes an LCD panel or an organic EL panel. The display unit 250 displays various types of setting information and the like of the static eliminator 200 under the control of the static eliminator control unit 230.

The operation unit 260 includes a plurality of operation buttons and is provided on the static eliminator housing 11 so as to be adjacent to the display unit 250. Specifically, the operation unit 260 includes an up button 261, a down button 262, a left button 263, a right button 264, an OK button 265, a cancel button 266, and a power button 267. The up button 261, the down button 262, the left button 263, the right button 264, the OK button 265, and the cancel button 266 are arranged on one side (right in this example) of the display unit 250. The power button 267 is arranged on the other side (left in this example) of the display unit 250. Further, the static eliminator housing 11 is provided with a main power switch (not illustrated) for turning on and off the static eliminator 200.

As described later, the static eliminator 200 can clean the electrode needles en1 and en2 by the cleaning device 291. The OK button 265 receives not only an instruction corresponding to a content displayed on the display unit 250 but also a cleaning start instruction. A user can issue the instruction corresponding to the content displayed on the display unit 250 to the static eliminator 200 by pressing the OK button 265 short, and issue the cleaning start instruction by pressing the OK button 265 for two seconds or longer. In the static eliminator 200, static elimination is not executed during execution of cleaning. Therefore, since the long press of the OK button 265 is assigned to the cleaning start instruction, it is possible to prevent provision of a period in which static elimination is not executed due to an erroneous operation of the operation unit 260 by the user.

The power button 267 receives a static elimination start instruction and a static elimination stop instruction. That is, the user can instruct the static eliminator 200 to start and stop the static elimination by pressing the power button 267. The static eliminator 200 starts the static elimination when the power button 267 is pressed in a state where the static eliminator 200 stops the static elimination, and the static eliminator 200 stops the static elimination when the power button 267 is pressed in a state where the static eliminator 200 is executing the static elimination.

Furthermore, the user can set an operation condition of the static eliminator 200 by operating the operation unit 260, and can display a detection result of the ion balance obtained by the ion balance sensor 100 on the display unit 250. Operation examples of other buttons such as the up button 261, the down button 262, the left button 263, the right button 264, the OK button 265, and the cancel button 266 will be described later together with display examples of the display unit 250.

Further, the static eliminator 200 may be configured to be operable in a lock mode. In the lock mode, a user who can change various operation conditions is limited to a specific user. Therefore, input of a password is requested at the time of changing various operation conditions set in the static eliminator 200. The user can input the password to the static eliminator 200 by operating the operation unit 260. When the password is input, the lock is temporarily released, and settings of various operation conditions can be changed. In this manner, only the specific user who knows the password can change various operation conditions by requesting the input of the password.

The static eliminator communication unit 280 in FIG. 5 receives signals of various types of information transmitted from the sensor communication unit 150 (FIG. 3) of the ion balance sensor 100 via the cable, and gives the signals to the static eliminator control unit 230. Further, when connected to the network 309 of FIG. 1, the static eliminator communication unit 280 receives signals of various types of information transmitted from the control device 300 via the network 309, and gives the signals to the static eliminator control unit 230. Furthermore, the static eliminator communication unit 280 transmits signals of various types of information output from the static eliminator control unit 230 to the control device 300.

The temporary storage unit 271 is a volatile storage unit, and is realized by, for example, a RAM. The temporary storage unit 271 sequentially stores various types of information at intervals of a certain time period. When information is stored in the entire predetermined storage area allocated to the temporary storage unit 271, information stored earliest is deleted, and the latest information is stored in a storage area generated by the deletion. As a result, the earliest information is overwritten with the latest information. Therefore, the temporary storage unit 271 functions as a ring buffer, and information once stored in the ring buffer is held for a certain period until being overwritten with the latest information.

For example, when the static eliminator communication unit 280 receives the ion balance signal from the ion balance sensor 100, the static eliminator control unit 230 stores the ion balance in the target space in the temporary storage unit 271 together with time period information. At this time, in addition to the storage operation described above, the static eliminator control unit 230 may cause the display unit 250 to display any message in a case where a received value of the ion balance is more than a predetermined ion balance threshold. The message displayed on the display unit 250 may be a message indicating that the received value of the ion balance exceeds the predetermined ion balance threshold, or may be a message indicating that the installation state of the static eliminator 200 is not appropriate in a case where the value and the threshold are used to determine the installation state of the static eliminator 200. Furthermore, the static eliminator control unit 230 may control the positive-polarity-side high voltage circuit 212 and the negative-polarity-side high voltage circuit 222 based on the received ion balance signal such that the ion balance in the target space approaches zero.

Further, when the static eliminator communication unit 280 receives the ion current signal from the ion balance sensor 100, the static eliminator control unit 230 stores the ion current in the target space in the temporary storage unit 271 together with time period information. At this time, in addition to the storage operation described above, the static eliminator control unit 230 may cause the display unit 250 to display a message indicating that the installation state of the static eliminator 200 is not appropriate in a case where a received value of the ion current is equal to or less than the ion current threshold.

Furthermore, when the static eliminator communication unit 280 receives the temperature signal and the humidity signal from the ion balance sensor 100, the static eliminator control unit 230 causes the temporary storage unit 271 to store the temperature and the humidity of the target space together with time period information. The static eliminator control unit 230 may compare the temperature or the humidity with a threshold and display a message based on a result of the comparison on the display unit 250.

The static eliminator storage unit 270 is a nonvolatile storage unit, and includes a memory or a hard disk. The static eliminator storage unit 270 stores a static eliminator management program for managing history data to be described later. The static eliminator management program includes a time setting program, a temporary storage unit control program, and a static eliminator storage unit control program.

Furthermore, the static eliminator control unit 230 samples information stored in the temporary storage unit 271 and stores the sampled information in the static eliminator storage unit 270. As a result, it is possible to manage a static elimination state of the object based on various types of information regarding the environment of the target space stored in the static eliminator storage unit 270 while suppressing an increase in the amount of data stored in the static eliminator storage unit 270. Details of the information stored in the static eliminator storage unit 270 will be described later.

The temporary storage unit 271 functions as the ring buffer as described above. Therefore, basically, only a part of the information stored in the temporary storage unit 271 is sampled and stored in the static eliminator storage unit 270, and most of the information is overwritten and deleted without being stored in the static eliminator storage unit 270. However, information can be displayed on a first layer screen of the display unit 250 in real time in a period when the information is stored in the temporary storage unit 271. The display examples of the display unit 250 will be described later.

The static eliminator power supply unit 290 receives power supplied from a commercial power supply through a power supply cable (not illustrated), and supplies a part of the received power to other constituent elements provided in the static eliminator 200. Further, the static eliminator power supply unit 290 supplies the rest of the received power to the sensor power supply unit 160 (FIG. 3) of the ion balance sensor 100 through the cable. In this example, when the power of the static eliminator 200 is turned on, the static eliminator 200 is activated, and power supply to the respective constituent elements of the static eliminator 200 is started.

The cleaning device 291 is configured to clean the plurality of electrode needles en1 and en2 of the positive ion generation unit 211 and the negative ion generation unit 221 with a brush, for example, and operates under the control of the static eliminator control unit 230. The indicator lamp 292 includes one or a plurality of light emitting diodes, and emits light, is turned off, or blinks under the control of the static eliminator control unit 230. The alarm device 293 outputs an alarm under the control of the static eliminator control unit 230. The indicator lamp 292 is arranged above the power button 267 of the operation unit 260 in the static eliminator housing 11 (see FIG. 7).

5. Configuration of Static Eliminator Control Unit

Figure 8:
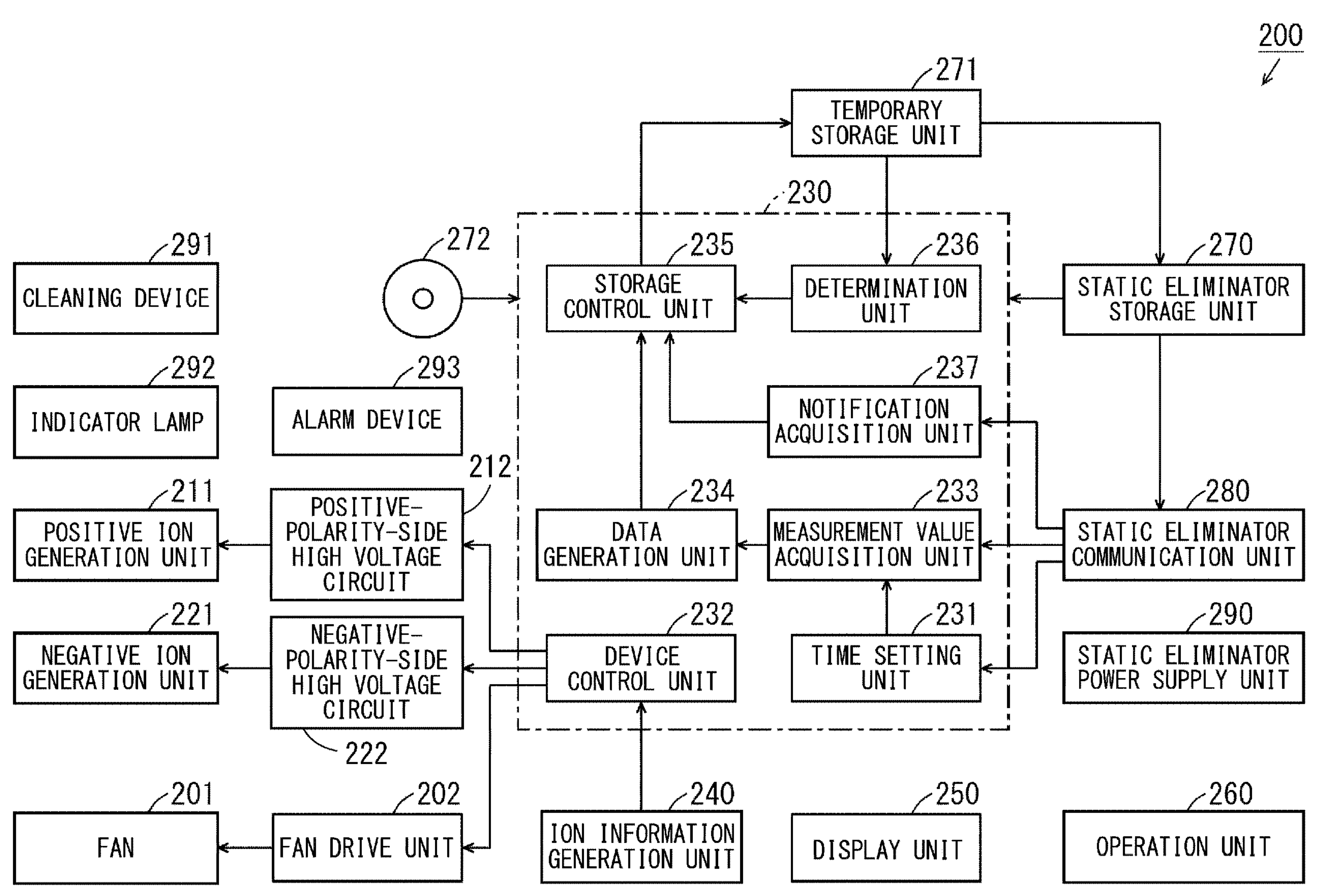
FIG. 8 is a block diagram of the static eliminator for describing a configuration of a static eliminator control unit.

FIG. 8 is a block diagram of the static eliminator 200 for describing a configuration of the static eliminator control unit 230. As illustrated in FIG. 8, the static eliminator control unit 230 includes, as functional units, a time setting unit 231, a device control unit 232, a measurement value acquisition unit 233, a data generation unit 234, a storage control unit 235, a determination unit 236, and a notification acquisition unit 237. The static eliminator control unit 230 executes the static eliminator management program stored in the static eliminator storage unit 270, thereby implementing the functional units of the static eliminator control unit 230.

The static eliminator management program may be stored in a computer-readable storage medium 272 such as a compact disc (CD)-ROM instead of the static eliminator storage unit 270. Alternatively, the static eliminator management program may be provided in a form of being stored in the storage medium 272 and installed in the static eliminator storage unit 270. Note that some or all of the functional units of the static eliminator control unit 230 may be implemented by hardware such as an electronic circuit.

The time setting unit 231 sets time in the static eliminator 200. Here, a deviation may occur in the time set for the plurality of static eliminators 200 due to individual differences. The time deviation increases as an elapsed time period from a time point when time has been set to any one of the static eliminators 200 increases. Therefore, the time setting unit 231 requests the control device 300 of FIG. 1 to transmit time information indicating time set in the control device 300 when the static eliminator communication unit 280 is connected to the network 309 of FIG. 1. Further, the time setting unit 231 receives the time information transmitted by the control device 300, and updates set time to the time indicated by the time information. This prevents the occurrence of the deviation in the time set for the plurality of static eliminators 200.

The device control unit 232 controls the fan drive unit 202, the positive-polarity-side high voltage circuit 212, and the negative-polarity-side high voltage circuit 222 to generate and supply an appropriate amount of ions to an object based on the ion information generated by the ion information generation unit 240. Further, the device control unit 232 controls operations of the display unit 250, the cleaning device 291, the indicator lamp 292, and the alarm device 293.

The measurement value acquisition unit 233 acquires measurement values related to the control by the device control unit 232. The measurement values includes the amount of ions, a charge amount, a rotational speed of the fan 201, ion balance, an ion current, and a temperature or a humidity. The ion balance, the ion current, the temperature or the humidity, and the like are measured by the ion balance sensor 100 of FIG. 3. Therefore, some of the measurement values are acquired from the ion balance sensor 100 via the static eliminator communication unit 280. Further, the measurement value acquisition unit 233 acquires a measurement time at which the measurement value has been acquired. The measurement time is specified based on time set by the time setting unit 231.

The charge amount is acquired based on an external current detected by the external ion current detection circuit 242, but the embodiment is not limited thereto. The charge amount may be acquired from the surface electrometer (not illustrated), or may be acquired from the ion balance sensor 100 when the ion balance sensor 100 is connected to the static eliminator 200. Alternatively, the charge amount may be acquired from the charge detection system 400 of FIG. 2.

The data generation unit 234 generates history data based on the measurement value and the measurement time acquired by the measurement value acquisition unit 233. Details of the history data will be described later. In particular, as the data generation unit 234 generates the history data based on the amount of ions and the rotational speed of the fan 201, a user can confirm whether or not the static eliminator 200 has been operating with an output capable of realizing a predetermined static elimination speed. Further, as the data generation unit 234 generates the history data based on the amount of ions, the rotational speed of the fan 201, and the ion balance, the user can confirm whether or not the static eliminator 200 has been operating with predetermined static elimination performance. Furthermore, as the data generation unit 234 generates the history data based on the amount of ions, the rotational speed of the fan 201, the ion balance, and the ion current, when having found a defect of the object caused by insufficient static elimination, the user can confirm whether the defect is caused by the operation of the static eliminator 200 or an external environment of the static eliminator 200.

The storage control unit 235 stores the history data generated by the data generation unit 234 in the temporary storage unit 271 at intervals of a certain time period (0.1 seconds in this example). Further, the storage control unit 235 samples a part of the history data stored in the temporary storage unit 271 at intervals of a certain time period (1 hour in this example) and stores the sampled history data in the static eliminator storage unit 270. Furthermore, when the determination unit 236, which will be described later, determines that an event has occurred, the storage control unit 235 stores pieces of history data stored in the temporary storage unit 271 for a certain period including an occurrence time of the event in the static eliminator storage unit 270, and stores data indicating a date and time when the event has occurred in the static eliminator storage unit 270 as the history data.

Every time the history data is stored in the temporary storage unit 271, the determination unit 236 determines whether or not predetermined events related to the measurement values of the history data have occurred. Specific types of the events include, for example, occurrence of an error in the rotational speed of the fan 201, occurrence of an installation abnormality of the static eliminator 200, and satisfaction of various alarm output conditions. Other types of the events include turning on or off of power of the static eliminator 200, a start or an end of static elimination, a start or an end of sensing of the charged object, an operation of the cleaning device 291, and the like.

More particularly, the events may include an error event, an alarm event, and a notification event. Thresholds for various measurement values are set in the static eliminator 200. Some thresholds are preset as fixed values in a non-changeable manner. On the other hand, the other thresholds can be designated to be any value by a setting performed by the user. It is detected that the above-described event has occurred in a case where a measurement value is more than a threshold for the measurement value, or in a case where a measurement value is equal to or less than a threshold for the measurement value. Further, some events may be detected only when the ion balance sensor 100 is connected to the static eliminator 200.

Further, in addition to the error event, the alarm event, and the notification event described above, the events may further include a predetermined event (hereinafter, referred to as a specific event) that is not related to a threshold. The user can select whether or not to detect the alarm event, the notification event, and the specific event by operating the operation unit 260 to perform a setting.

The error event is an event indicating that a situation in which it is difficult to appropriately continue the static elimination has occurred. Therefore, in a case where the error event is detected, the static elimination is automatically stopped. Further, the storage of history data in the temporary storage unit 271 is stopped.

As an example of the error event, in a case where the rotational speed of the fan 201 does not rise to a predetermined speed (rotational speed at Air volume level "1" to be described later) or more, an error event of a rotation abnormality is detected. If a current of a predetermined value or more flows through the positive-polarity-side high voltage circuit 212 or the negative-polarity-side high voltage circuit 222, an error event of abnormal discharge is detected. If the cover 13 is not appropriately attached to the static eliminator housing 11, an error event of a cover abnormality is detected. When reading and writing of the temporary storage unit 271 fails, an error event of a system memory is detected.

The alarm event is an event for prompting the user for confirmation in a case where the static eliminator 200 exhibits a behavior different from a behavior assumed in advance, and is detected based on a threshold preset as a fixed value in the static eliminator 200. The behavior of the static eliminator 200 when the alarm event is detected is allowable for some users. Therefore, when the alarm event is detected, the alarm device 293 outputs an alarm, but the static elimination is continued without being stopped. Further, the storage of history data in the temporary storage unit 271 is also continued without being stopped.

As an example of the alarm event, when the rotational speed of the fan 201 is more than a rotational speed threshold or equal to or less than less than the rotational speed threshold, an event (fan rotational speed alarm event) related to a value of the rotational speed of the fan 201 is detected. Note that the threshold for the rotational speed of the fan 201 is set according to an air volume level to be described later. Here, both an upper limit and a lower limit are not necessarily set regarding the threshold for the rotational speed of the fan 201. The same applies to other thresholds. For example, in a case where a decrease in the rotational speed of the fan 201 is assumed as an abnormality occurring in the fan 201, only a threshold as the lower limit may be set, and only a determination as to whether the rotational speed of the fan 201 is equal to or less than the rotational speed threshold may be performed.

If an ion current value is equal to or less than an ion current threshold, an event (ion level alarm event) related to the ion current value is detected. The ion current decreases when the electrode needles en1 and en2 that generate ions are worn or when dirt adheres to the electrode needles en1 and en2. Therefore, as the ion level alarm event is detected, for example, when it is determined that the ion current is equal to or less than the threshold, it is possible to notify the user of a state where it is difficult to generate a predetermined amount of ions.

In a case where the ion balance sensor 100 is connected to the static eliminator 200, the ion balance is measured. If a measured ion balance value is more than an ion balance threshold, an event (installation abnormality alarm event) related to the ion balance value is detected. If the static eliminator 200 is not appropriately installed, an appropriate amount of ions does not reach the ion balance sensor 100, so that the ion balance is biased in a positive direction or a negative direction. Therefore, as the installation abnormality alarm event is detected, it is possible to notify the user that the static eliminator 200 is not appropriately installed.

Further, in the case where the ion balance sensor 100 is connected to the static eliminator 200, the temperature and the humidity are measured. If a measured temperature or humidity value exceeds each preset threshold, an event (condition alarm event) related to the temperature or humidity value is detected. As the condition alarm event is detected, the static eliminator 200 can notify the user of an abnormality in the surrounding environment.

The notification event is an event for notifying the user in a case where the static eliminator 200 exhibits a behavior different from a behavior assumed by the user, and is detected based on a threshold set in the static eliminator 200 by the user. Even when the notification event is detected, the static elimination is continued without being stopped. Further, the storage of history data in the temporary storage unit 271 is also continued without being stopped.

As an example of the notification event, an ion balance notification event is detected in a case where the ion balance value measured by the ion balance sensor 100 is more than a threshold designated by the user. When the temperature or the humidity measured by the ion balance sensor 100 exceeds each threshold designated by the user, a temperature notification event or a humidity notification event is detected.

In this example, an approximate value of the charge amount of the object is evaluated based on the external current detected by the external ion current detection circuit 242. The approximate value of the charge amount of the object evaluated based on the external current is referred to as a charge level. In a case where the evaluated charge level exceeds a threshold designated by the user, a charge level notification event is detected. The charge amount may be evaluated based on the ion balance measured by the ion balance sensor 100, and the similar event may be detected based on the evaluated charge amount and a threshold. Further, the similar event may be detected based on the charge amount measured by the surface electrometer (not illustrated) or the charge detection system 400 of FIG. 1 and a threshold.

Examples of the specific event include a start of static elimination, a stop of static elimination, settings of various thresholds, changes of various thresholds, a start of cleaning, a stop of cleaning, or input of a signal to an input terminal, which will be described later, of the static eliminator 200. During the stop of static elimination, the storage of history data in the temporary storage unit 271 is stopped. Further, the static elimination is stopped during the execution of cleaning as described above. Therefore, the storage of history data in the temporary storage unit 271 is also stopped during the execution of cleaning.

When the static eliminator communication unit 280 is connected to the network 309, the control device 300 acquires history data stored in the static eliminator storage unit 270. Further, the control device 300 notifies the static eliminator 200 that the history data has been acquired. The notification acquisition unit 237 acquires the notification from the control device 300. In this case, the storage control unit 235 may delete the history data stored in the static eliminator storage unit 270.

The history data includes first data, second data, and third data. The first data is data in which measurement values acquired at intervals of a first time period (1 hour in this example) are associated with measurement times. The second data is data in which measurement values acquired when various events have occurred are associated with measurement times. The third data is data indicating a date and time when various events have occurred.

Figure 9:
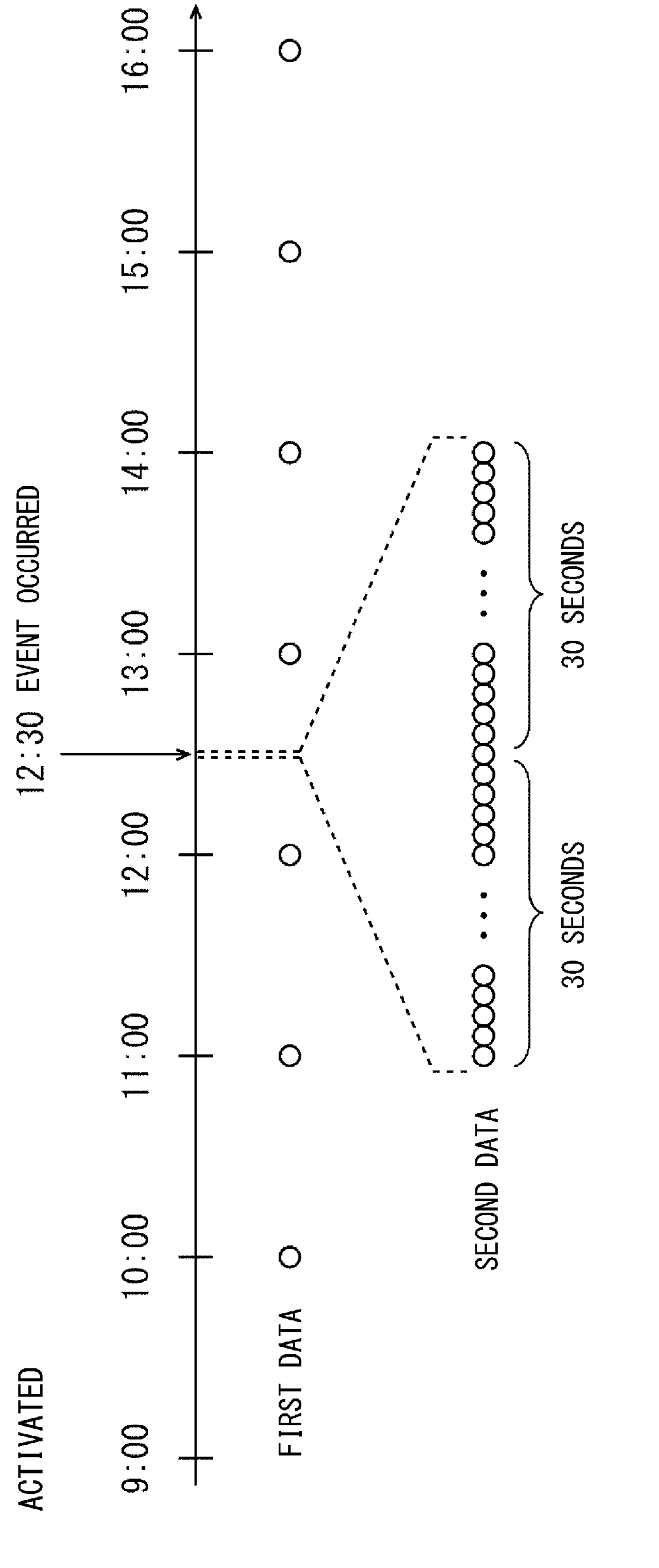
FIG. 9 is a view for describing history data stored in a static eliminator storage unit of FIG. 8.

FIG. 9 is a view for describing the history data stored in the static eliminator storage unit 270 of FIG. 8. As illustrated in FIG. 9, in this example, the power of the static eliminator 200 is turned on at 9:00. As a result, the static eliminator 200 is activated, and power supply to the respective constituent elements of the static eliminator 200 is started. When the static eliminator 200 is activated, a calculation of an elapsed time period begins from an activation time of the static eliminator 200 as a starting point.

Note that communication is established between the static eliminator 200 and the control device 300 by activating the static eliminator 200 when the static eliminator 200 is connected to the network 309. In this case, the time setting unit 231 requests the control device 300 to transmit time information and receives the time information from the control device 300 to update time set in the static eliminator 200.

After the static eliminator 200 is activated, the static elimination of the object is started. As a result, pieces of history data in which various measurement values acquired by the ion balance sensor 100 and the static eliminator 200 are associated with measurement times are sequentially stored in the temporary storage unit 271 of FIG. 8 at intervals of a second time period (0.1 seconds in this example).

Here, every time the first time period elapses, history data stored in the temporary storage unit 271 at a time point when the first time period has elapsed is stored in the static eliminator storage unit 270 as the first data. Although the first time period is 1 hour in this example, the embodiment is not limited thereto. The user can set the first time period to any time period longer than the second time period by operating the operation unit 260.

Further, in this example, the first time period is set using relative time starting from time when the static eliminator 200 is activated. Specifically, since the first time period is 1 hour, in a case where the static eliminator 200 is activated at 9:00, whenever time is 10:00, 11:00, 12:00, 13:00, and so on, the history data stored in the temporary storage unit 271 at each time is stored in the static eliminator storage unit 270 as the first data. However, the embodiment is not limited thereto. The user can set the first time period with absolute time by operating the operation unit 260. In this case, regardless of the time when the static eliminator 200 is activated, the history data stored in the temporary storage unit 271 at predetermined time is stored in the static eliminator storage unit 270 as the first data.

Further, every time the first time period elapses, characteristic values of some measurement values in the history data stored in the temporary storage unit 271 within the first time period are stored in the static eliminator storage unit 270. In this example, every time the first time period elapses, characteristic values of a temperature, humidity, and ion balance within the first time period are stored in the static eliminator storage unit 270.

Furthermore, regarding the ion balance, a characteristic value between a time point when the first time period has elapsed and a time point one minute before the time point is stored in the static eliminator storage unit 270 together with the above characteristic value or instead of the above characteristic value. The characteristic value may be, for example, at least one of a maximum value and a minimum value, or may be an average value. Alternatively, the characteristic value may include all of the maximum value, the minimum value, and the average value.

Here, acquired measurement values are unstable in a period immediately after the activation of the static eliminator 200 or immediately after resumption of the static elimination. Therefore, in the above-described storage of the characteristic value for 1 minute regarding the ion balance, a period of 30 seconds after the activation of the static eliminator 200 and a period of 10 seconds after the resumption of the static elimination are treated as invalid periods. In this case, consecutive characteristic values for 1 minute in a valid period closest to the time point when the first time period has elapsed are stored. For example, in a case where the static elimination is temporarily stopped so that an invalid period is included between a time point when the first time period has elapsed and a time point one minute before the time point, characteristic values at the time point when the static elimination is temporarily stopped and a time point one minute before the time point are stored in the static eliminator storage unit 270.

In the example of FIG. 9, an event occurs at 12:30. In this case, history data including measurement values of 601 points stored in the temporary storage unit 271 in a certain period (1 minute in this example) including 12:30 is stored as the second data. Specifically, the history data stored in the temporary storage unit 271 in a period from 30 seconds before the event occurrence time to 30 seconds after the event occurrence time is stored as the second data.

Further, data indicating the date and time when the above-described event has occurred is stored in the static eliminator storage unit 270 as the third data. In this example, the date and time when the event has occurred is "2022/3/24/12:30". Further, a measurement value of one point at a time point when the event has occurred may be stored in the static eliminator storage unit 270 as the third data.

Note that, in a case where an event of the same type has occurred one or more times before an end period (30 seconds in this example) of the second data elapses from a time point at which a certain event occurred, the second data is stored only for the event occurring earliest. Meanwhile, the third data is stored not only for the event occurring earliest but also for each of the one or more events of the same type occurring thereafter.

On the other hand, in a case where an event of another type has occurred one or more times before the end period of the second data elapses from a time point at which a certain event occurred, the second data is stored not only for the event occurring earliest but also for each of the one or more events of another type occurring thereafter. The same applies to the third data.

The static eliminator storage unit 270 can store the first data in a data amount for a period of 1 year, the second data in a data amount for 100 events, and the third data in a data amount for 3000 events. When the static eliminator 200 and the control device 300 are connected, the history data stored in the static eliminator storage unit 270 is stored in a main storage unit, which will be described later, of the control device 300. In this case, the history data stored in the static eliminator storage unit 270 may be deleted.

On the other hand, when the static eliminator 200 and the control device 300 are not connected for a long period, a data amount of the history data stored in the static eliminator storage unit 270 sometimes reaches an upper limit of the data amount. In this case, history data stored earliest is deleted from the static eliminator storage unit 270, and the latest history data is stored in a storage area generated by the deletion.

Further, the static eliminator 200 may be provided with an input terminal and an output terminal. In this example, the static eliminator 200 is provided with first to third input terminals and first to third output terminals. A control apparatus, such as a programmable controller, can be connected to each of the terminals.

The first input terminal is a static elimination stop terminal, and the static elimination is stopped when a signal is input to the first input terminal. The second input terminal is a cleaning terminal, and cleaning of the electrode needles en1 and en2 is started by the cleaning device 291 in response to the input of a signal to the second input terminal. The third input terminal is an event extraction terminal, and information based on history data stored in the temporary storage unit 271 is stored in the static eliminator storage unit 270 in the similar manner as when the event has occurred in response to the input of a signal to the third input terminal. As a result, the user can cause the static eliminator storage unit 270 to store the first data, the second data, and the third data according to a timing desired by the user.

Even when a signal is input to either the first input terminal or the second input terminal, an operation of the static eliminator 200 based on the signal is detected as an event, and data based on history data stored in the temporary storage unit 271 is stored in the static eliminator storage unit 270. In this example, the respective input terminals are assigned as described above, but any of the input terminals may be treated as an input terminal that receives a data extraction request from an external apparatus, for example. In this case, information stored in the static eliminator storage unit 270 is stored in any storage medium in response to the input of the signal to the input terminal. As a result, the information stored in the static eliminator storage unit 270 can be extracted at a timing desired by the user.

Assignments of the first to third output terminals can be changed by a setting. In the initial setting, the first output terminal outputs a signal indicating a running state of the static eliminator 200 (whether or not the static elimination is being executed). The second output terminal outputs a signal for outputting an alarm when at least one event of a plurality of events belonging to the error event or the alarm event is detected. The third output terminal outputs a signal for notifying the user when at least one event of a plurality of events belonging to the notification event is detected.

6. Display Examples of Display Unit

Figure 10:
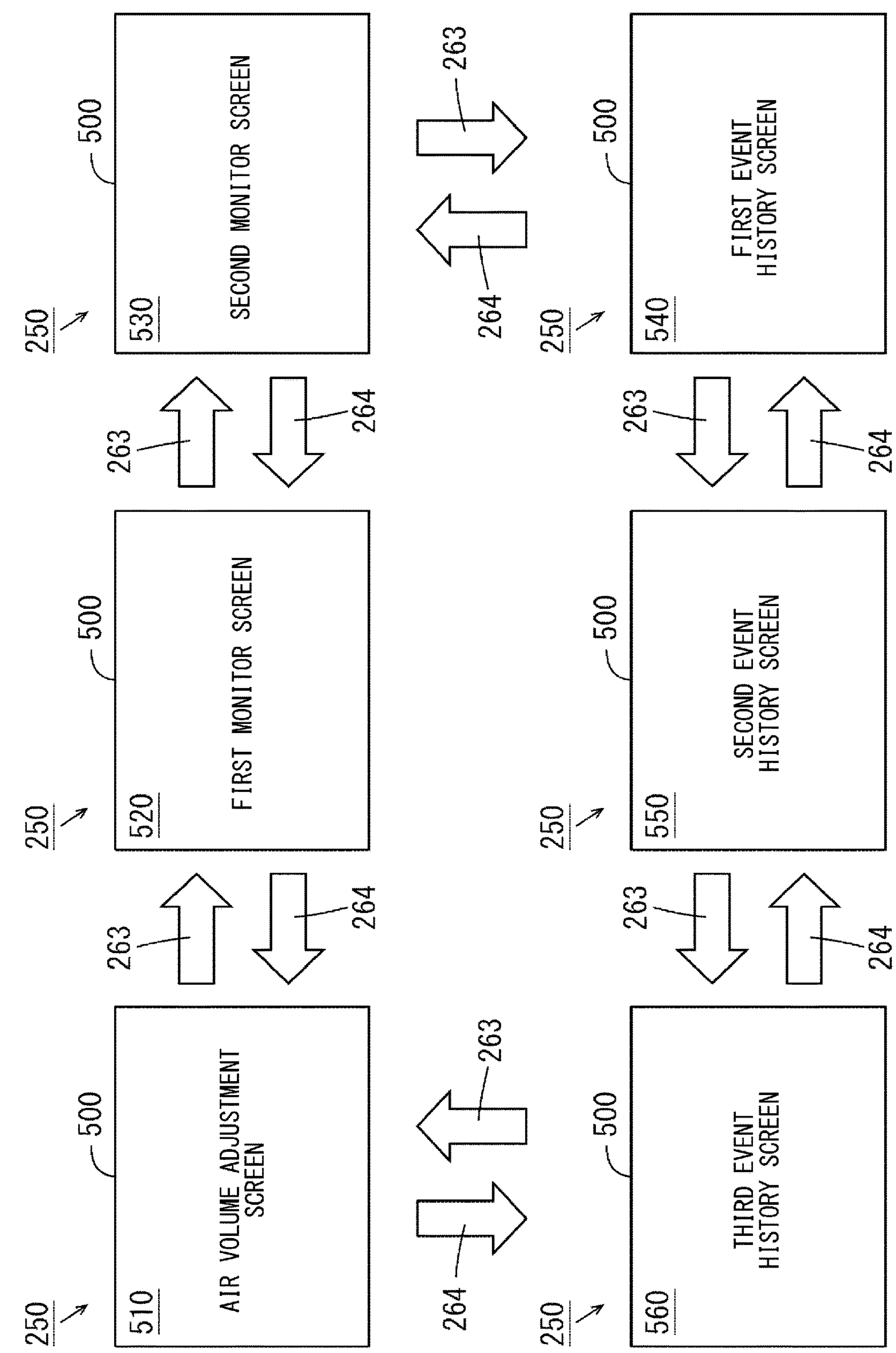
FIG. 10 is a view illustrating an example of a first layer screen.

When a main power switch (not illustrated) of the static eliminator housing 11 is turned on, the static eliminator 200 is activated. After the activation of the static eliminator 200, a predetermined activation screen is displayed on the display unit 250, and then, the first layer screen is displayed. FIG. 10 is a view illustrating an example of the first layer screen. As illustrated in FIG. 10, a first layer screen 500 includes a screen for monitoring a state of the static eliminator 200 or a screen for setting a setting item which is frequently changed, and includes a plurality of types (six types in this example) of screens. The six types of first layer screens 500 are referred to as an air volume adjustment screen 510, a first monitor screen 520, a second monitor screen 530, a first event history screen 540, a second event history screen 550, and a third event history screen 560, respectively.

Any one of the above six types of first layer screens 500 is displayed on the display unit 250. Every time the left button 263 of the operation unit 260 in FIG. 7 is operated, the first layer screens 500 displayed on the display unit 250 are switched in a predetermined order. Further, every time the right button 264 of the operation unit 260 is operated, the first layer screens 500 displayed on the display unit 250 are switched in the reverse order from when the left button 263 is operated.

The second monitor screen 530 can be displayed on the display unit 250 in a case where the ion balance sensor 100 is connected to the static eliminator 200. Therefore, in the case where the static eliminator 200 is connected to the ion balance sensor 100, when the left button 263 is operated in a state where the first monitor screen 520 is displayed on the display unit 250, the first monitor screen 520 is switched to the second monitor screen 530. Alternatively, when the right button 264 is operated in a state where the first event history screen 540 is displayed on the display unit 250, the first event history screen 540 is switched to the second monitor screen 530.

On the other hand, in a case where the static eliminator 200 is not connected to the ion balance sensor 100, when the left button 263 is operated in a state where the first monitor screen 520 is displayed on the display unit 250, the second monitor screen 530 is skipped, and the first monitor screen 520 is switched to the first event history screen 540. Similarly, when the right button 264 is operated in a state where the first event history screen 540 is displayed on the display unit 250, the second monitor screen 530 is skipped, and the first event history screen 540 is switched to the first monitor screen 520.

In this manner, the number of screens displayed as the first layer screens 500 when the ion balance sensor 100 is not connected to the static eliminator 200 is smaller than the number of screens displayed as the first layer screens 500 when the ion balance sensor 100 is connected to the static eliminator 200. Therefore, it is possible to reduce operation procedures when a user displays a desired screen of the first layer screens 500. In this example, the second monitor screen 540 is not displayed when the ion balance sensor 100 is not connected to the static eliminator 200, and only the other screens of the first layer screens 500 are displayed. However, a configuration may be employed in which an alternative screen of the second monitor screen 540 is displayed as the first layer screen when the ion balance sensor 100 is not connected to the static eliminator 200.

The first layer screen 500 is a screen that is easily displayed by the user, and thus, includes a screen for displaying a static elimination state of the static eliminator 200. In practice, for the user, a frequency of work of changing various operation conditions of the static eliminator 200 is lower than a frequency of work of confirming the static elimination state of the static eliminator 200, and thus, a setting of the various operation conditions is performed on and after the second layer screen deeper than the first layer screen 500. In practice, however, an air volume among the various operation conditions of the static eliminator 200 is more frequently changed as compared with the other operation conditions. Therefore, in this example, the first layer screen 500 includes the air volume adjustment screen 510 for displaying an air volume, set at this time point as the static elimination state of the static eliminator 200, and receiving a change in the air volume. That is, the user can set the air volume in the various operation conditions of the static eliminator 200 on the first layer screen 500.

Figure 11:
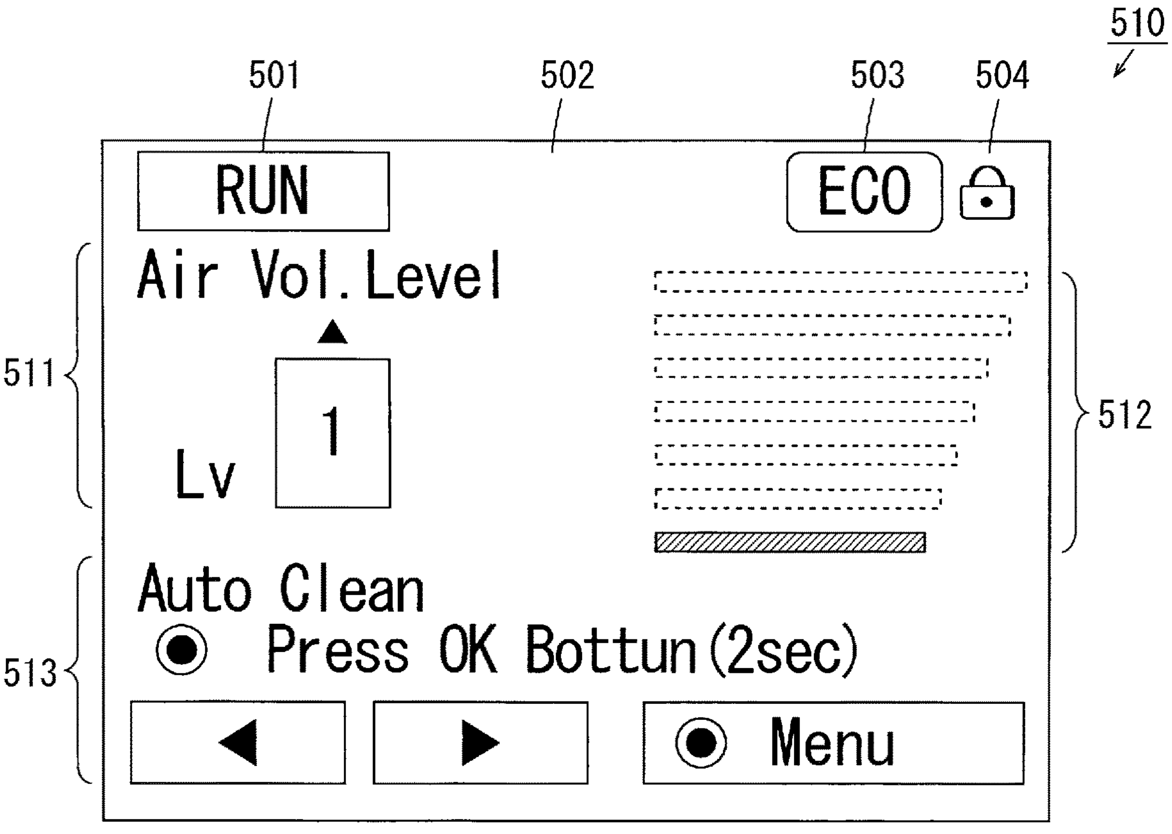
FIG. 11 is a view illustrating an example of an air volume adjustment screen.

FIG. 11 is a view illustrating an example of the air volume adjustment screen 510. As illustrated in FIG. 11, the air volume adjustment screen 510 displays a running state display area 501, an event display area 502, an eco-mode display area 503, and a lock mode display area 504. Further, an air volume value display area 511, an air volume gauge display area 512, and an explanation display area 513 are further displayed on the air volume adjustment screen 510. The running state display area 501, the event display area 502, the eco-mode display area 503, and the lock mode display area 504 are also displayed on the other first layer screens 500.

In the running state display area 501, the running state of the static eliminator 200 is displayed. A character string "RUN" is displayed during the execution of the static elimination, and a character string "STOP" is displayed during the stop of the static elimination. These displays are switched every time the power button 267 of the operation unit 260 in FIG. 7 is pressed short. In the event display area 502, when any event belonging to the error event, the alarm event, or the notification event is detected, an icon and a character string indicating a type of the event are displayed. Details of the event display area 502 will be described with the first monitor screen 520.

In the eco-mode display area 503, whether or not the static eliminator 200 is operating in the eco-mode is displayed. A character string "ECO" is displayed in a case where the static eliminator 200 is operating in the eco-mode, and nothing is displayed in a case where the static eliminator 200 is not operating in the eco-mode. In the lock mode display area 504, whether or not the static eliminator 200 is operating in the lock mode is displayed. A key mark is displayed in a case where the static eliminator 200 is operating in the lock mode, and nothing is displayed in a case where the static eliminator 200 is not operating in the lock mode. Further, the key mark is displayed to be light (grayed out) in a case where the password has been input in the lock mode, that is, in a case where the lock has been temporarily released.

A character string "Air Vol. Level" is displayed in the air volume value display area 511. Further, in this example, the air volume by the fan 201 is divided into seven levels of Air volume levels "1" to "7" based on the rotational speed of the fan 201. In the air volume value display area 511, a current air volume level is displayed numerically. Note that the static eliminator 200 is operating in the eco-mode in the example of FIG. 11. Therefore, the air volume level is "1" which is the lowest. When the air volume level is changed in this state, a confirmation message for canceling the eco-mode may be displayed on the air volume adjustment screen 510.

In the air volume gauge display area 512, a current air volume level is displayed using a gauge. In this example, the gauge includes seven bars extending laterally. The seven bars have lengths corresponding to Air volume levels "1" to "7", respectively. Bars corresponding to the current air volume level and an air volume level equal to or lower than the current air volume level are displayed in color, and the other bars are displayed to be grayed out. The color may vary for each range of the air volume levels. For example, bars for Air volume levels "1" and "2" may be displayed in green, bars for Air volume levels "3" to "5" may be displayed in yellow, and bars for Air volume levels "6" and "7" may be displayed in red.

In the explanation display area 513, simple explanations of some buttons of the operation unit 260 are displayed. The example of FIG. 11 illustrates that the air volume adjustment screen 510 is switched to another first layer screen 500 by operating the left button 263 or the right button 264. Further, it is illustrated that the first layer screen 500 transitions to a menu screen (second layer screen) for performing various settings when the OK button 265 is operated. Furthermore, it is illustrated that cleaning of the electrode needles en1 and en2 by the cleaning device 291 is started when the power button 267 is pressed long.

Figure 12:
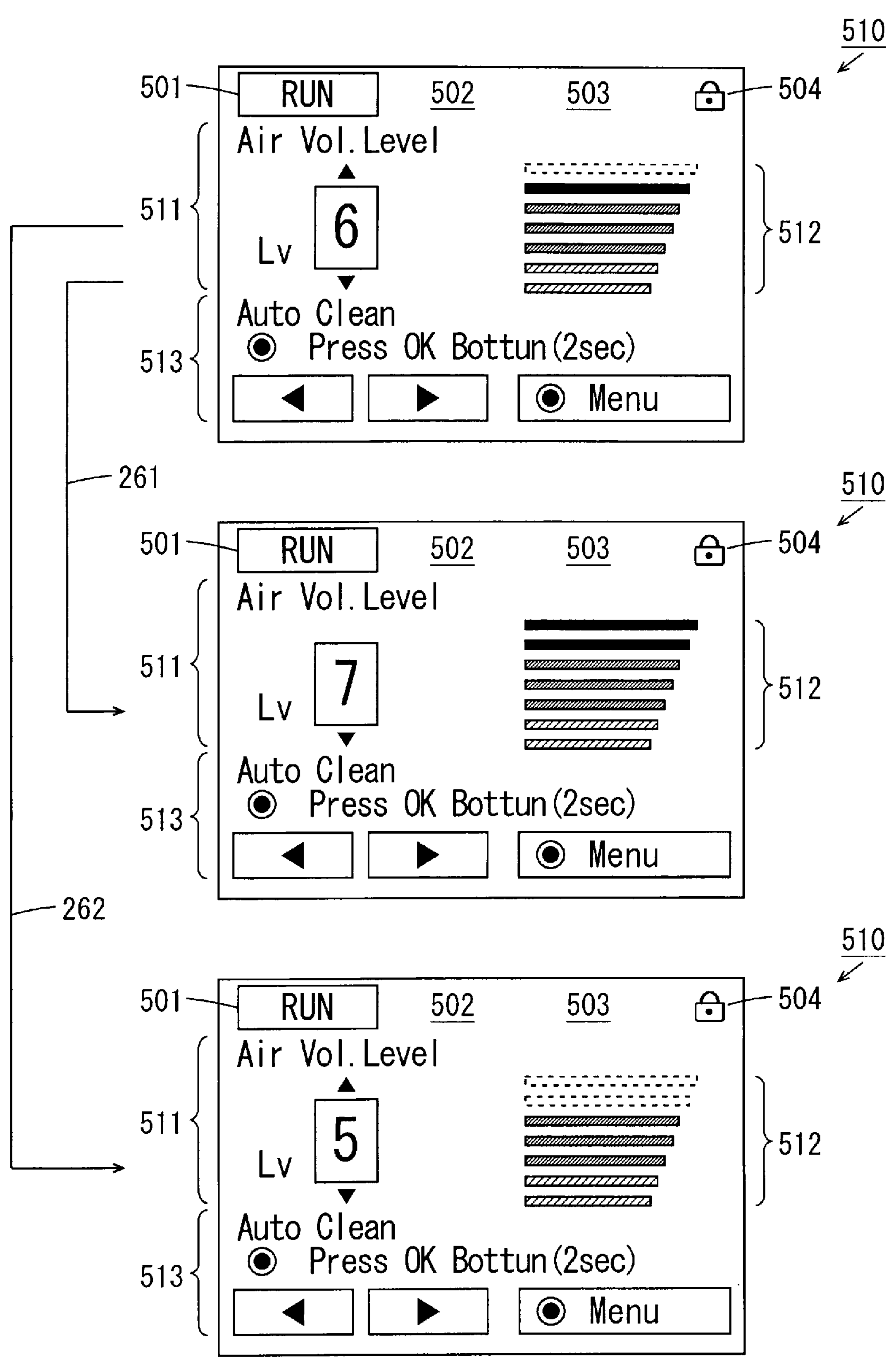
FIG. 12 is a view illustrating an example of a change of a setting of an air volume on the air volume adjustment screen.

When the up button 261 is operated on the air volume adjustment screen 510, the air volume level increases by the number of times the up button 261 has been operated up to Air volume level "7". Further, when the down button 262 is operated, the air volume level decreases by the number of times the down button 262 has been operated up to Air volume level "1". FIG. 12 is a view illustrating an example of a change of a setting of the air volume on the air volume adjustment screen 510. As illustrated in the upper part of FIG. 12, the air volume level is set to "6" before the change. Therefore, a numerical value displayed in the air volume value display area 511 is "6". Further, the number of bars displayed in color in the air volume gauge display area 512 is six.

In a state of the upper part of FIG. 12, the up button 261 is operated once. In this case, the air volume level is increased by one, and the setting of the air volume level is changed to "7". As a result, the numerical value in the air volume value display area 511 becomes "7" as illustrated in the middle part of FIG. 12. Further, the number of bars displayed in color in the air volume gauge display area 512 is seven. On the other hand, the down button 262 is operated once in the state of the upper part of FIG. 12. In this case, the air volume level is decreased by one, and the setting of the air volume level is changed to "5". As a result, the numerical value in air volume value display area 511 becomes "5" as illustrated in the lower part of FIG. 12. Further, the number of bars displayed in color in the air volume gauge display area 512 is five.

Figure 13:
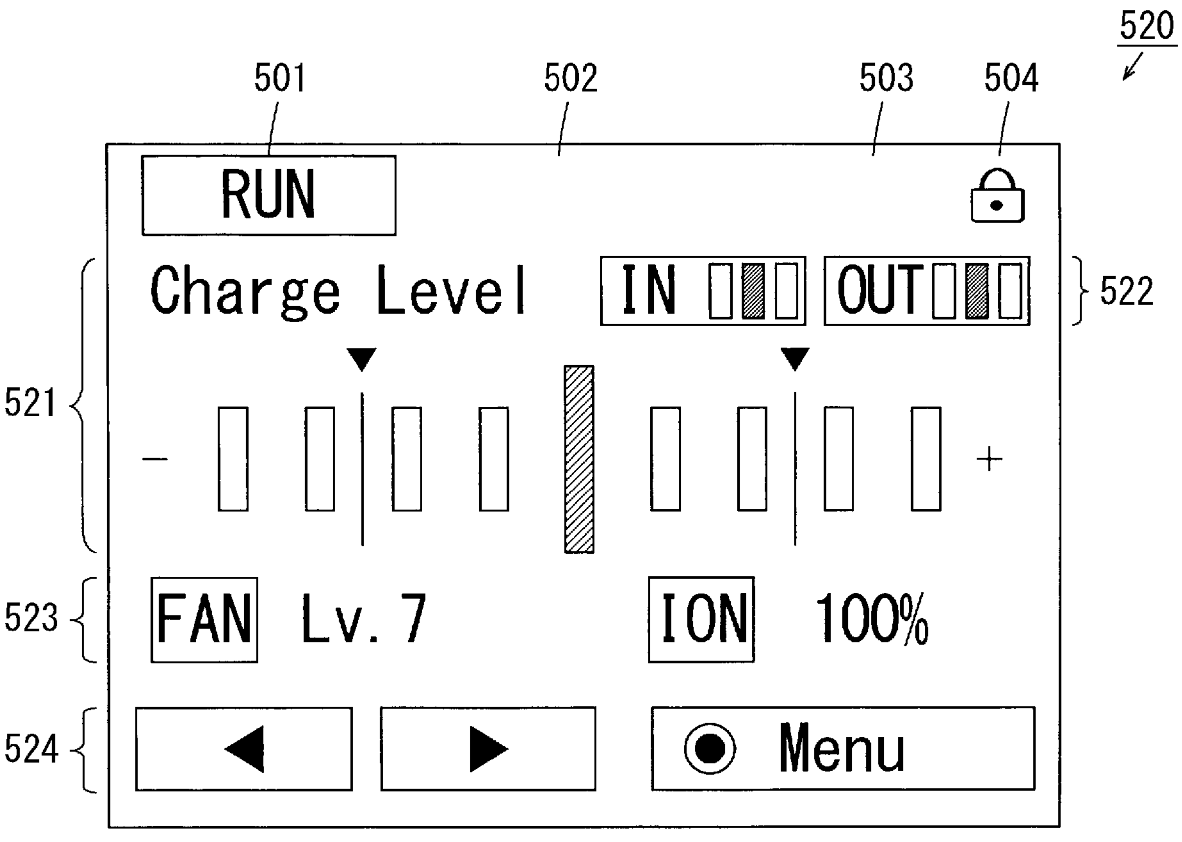
FIG. 13 is a view illustrating an example of a first monitor screen.

FIG. 13 is a view illustrating an example of the first monitor screen 520. As illustrated in FIG. 13, the running state display area 501, the event display area 502, the eco-mode display area 503, and the lock mode display area 504 are displayed on the first monitor screen 520. Further, a charge level display area 521, an input/output display area 522, a static elimination performance display area 523, and an explanation display area 524 are displayed on the first monitor screen 520.

In the charge level display area 521, a character string "Charge Level" is displayed. Further, a charge level of an object is displayed using a gauge in the charge level display area 521. Furthermore, a line indicating a threshold of the charge level is displayed in the charge level display area 521. In this example, the charge level is displayed as a vertically extending bar moves to the left and right.

Specifically, when the charge level is close to 0, the bar is located at the center. When the charge level is negatively high, the bar moves to the left. When the charge level is positively high, the bar moves to the right. A color of the bar to be displayed may vary depending on whether or not the charge level is within a threshold range. In the example of FIG. 13, the charge level is within the threshold range. Therefore, the bar is displayed in green, for example. On the other hand, when the charge level is out of the threshold range, the bar is displayed in red.

In the input/output display area 522, use states of the input terminals and the output terminals are displayed. In this example, terminal which are being used among the first to third input terminals and the first to third output terminals are displayed with icons in a distinguishable manner. When the input terminals are not used, the icons of the input terminals are not displayed. Similarly, when the output terminals are not used, the icons of the output terminals are not displayed. In the example of FIG. 13, the second input terminal and the second output terminal are used.

In the static elimination performance display area 523, a measurement value related to static elimination performance and a predetermined sentence corresponding to the measurement value are displayed. In this example, in the static elimination performance display area 523, the air volume level of the fan 201 and the amount of ions generated by the positive ion generation unit 211 and the positive-polarity-side high voltage circuit 212 are displayed as measurement values related to a static elimination time period out of the static elimination performance. Further, character strings of "FAN" and "ION" are displayed in the static elimination performance display area 523. Note that the static elimination time period means a time period required to neutralize an electric charge of a metal plate holding the amount of the electric charge defined by the standard.

In this example, the amount of ions is displayed not as an absolute value but as a relative value compared with the amount of generated ions in a reference state (for example, a state at the time of shipment) of the static eliminator 200. Therefore, the unit of the amount of ions is %. The user can evaluate the static elimination time period based on the air volume level and the amount of ions displayed in the static elimination performance display area 523. Specifically, as the air volume level is higher and the amount of ions is larger, more ions can be supplied, and thus, the static elimination time period is shortened.

Similar to the explanation display area 513 of the air volume adjustment screen 510, simplified explanations of some buttons of the operation unit 260 are displayed in the explanation display area 524. Note that an explanation about the long press of the power button 267 is not displayed in the explanation display area 524 in the example of FIG. 13, but the embodiment is not limited thereto. In a case where the explanation display area 524 has a sufficiently wide display space, the explanation about the long press of the power button 267 may be displayed in the explanation display area 524 as in the explanation display area 513.

As described above, in the event display area 502, when any event belonging to the error event, the alarm event, or the notification event is detected, an icon and a character string indicating a type of the event are displayed. FIG. 14 is a view for describing details of the event display area 502. In an example in the upper part of FIG. 14, the charge level is lower than the threshold. Therefore, the bar indicating the charge level in the charge level display area 521 is displayed in red, for example.

Further, when the charge level becomes lower than the threshold, the notification event (in this example, the charge level notification event) is detected. In this case, a diamond-shaped icon representing the notification event and a character string "NOTICE" are displayed in the event display area 502 in a state of being decorated in a predetermined color (for example, orange).

Here, among character strings displayed in the other display areas, a character string related to the detected event may be decorated and displayed in the same color as the decorative color of the event display area 502. In the example in the upper part of FIG. 14, the character string "Charge Level" in the charge level display area 521 and the character string "ION" in the static elimination performance display area 523 are displayed in orange similar to the decorative color of the event display area 502.

Similarly, when the error event due to the rotation abnormality of the fan 201, the fan rotational speed alarm event, or the like is detected, the character string "Air Vol. Level" in the air volume value display area 511 of FIG. 11 is displayed in a state of being decorated in a predetermined color. As a result, the user can easily recognize the measurement value related to the detected event.

The middle part of FIG. 14 illustrates a display example of the event display area 502 when the alarm event is detected. In the example in the middle part of FIG. 14, when the alarm event is detected, a triangular icon indicating the alarm event and a character string "ALARM" are displayed in the event display area 502 in a state of being decorated in another color (for example, yellow).

The lower part of FIG. 14 illustrates a display example of the event display area 502 when the error event is detected. In the example in the lower part of FIG. 14, when the error event is detected, a circular icon indicating the error event and a character string "ERROR" are displayed in the event display area 502 in a state of being decorated in still another color (for example, red).

Figure 15:
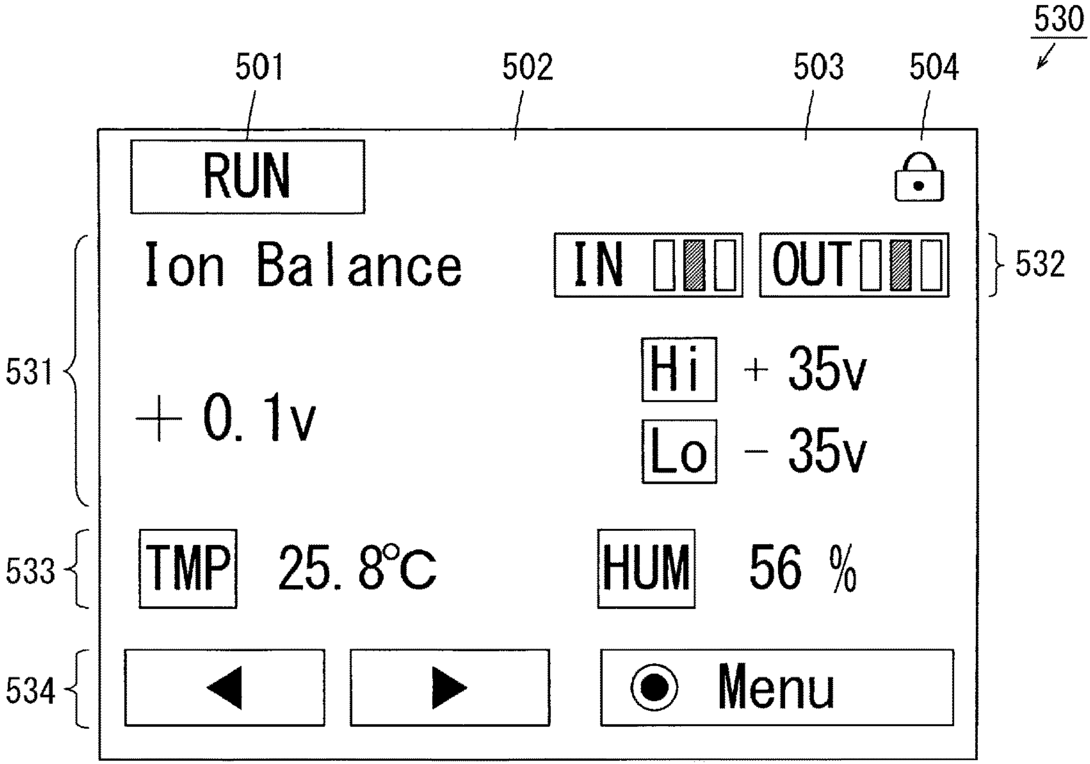
FIG. 15 is a view illustrating an example of a second monitor screen.

FIG. 15 is a view illustrating an example of the second monitor screen 530. As illustrated in FIG. 15, the running state display area 501, the event display area 502, the eco-mode display area 503, and the lock mode display area 504 are displayed on the second monitor screen 530. Further, an ion balance display area 531, an input/output display area 532, a temperature and humidity display area 533, and an explanation display area 534 are displayed on the second monitor screen 530.

In the ion balance display area 531, a character string "Ion Balance" is displayed. Further, a numerical value of the ion balance measured by the ion balance sensor 100 is displayed in the ion balance display area 531. The unit of the ion balance is V (volt). Furthermore, an upper limit and a lower limit of an ion balance threshold are displayed in the ion balance display area 531. Similarly to the input/output display area 522 of the first monitor screen 520, use states of the input terminals and the output terminals are displayed in the input/output display area 532.

In the temperature and humidity display area 533, a temperature measured by the ion balance sensor 100 and a character string "TMP" are displayed. Further, humidity measured by the ion balance sensor 100 and a character string "HUM" are displayed in the temperature and humidity display area 533. Similar to the explanation display area 524 of the first monitor screen 520, the explanation display area 534 displays simple explanations of some buttons of the operation unit 260.

Also on the second monitor screen 530, when an event related to the ion balance, the temperature, or the humidity is detected, an icon and a character string indicating a type of the event are displayed in the event display area 502. Further, the character string such as "Ion Balance", "TMP", or "HUM" is displayed in a state of being decorated with a color similar to the decorative color of the event display area 502.

Figure 16:
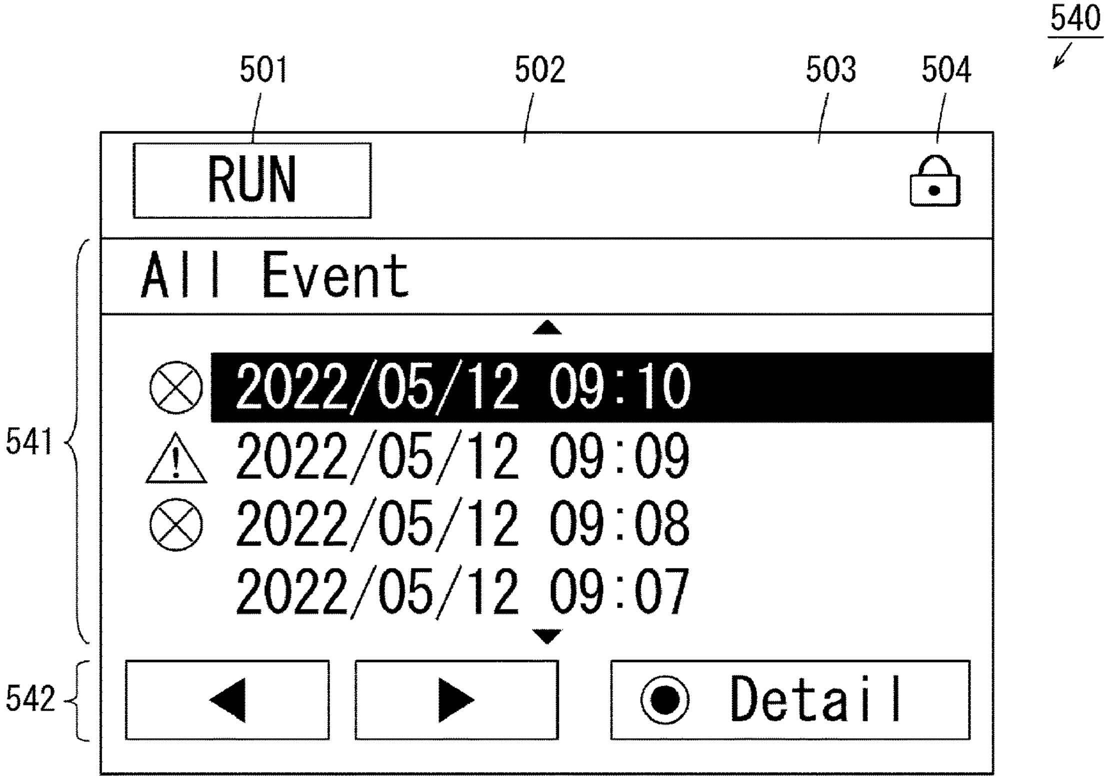
FIG. 16 is a view illustrating an example of a first event history screen.

FIG. 16 is a view illustrating an example of the first event history screen 540. As illustrated in FIG. 16, the running state display area 501, the event display area 502, the eco-mode display area 503, and the lock mode display area 504 are displayed on the first event history screen 540. Further, an all-event display area 541 and an explanation display area 542 are also displayed on the first event history screen 540.

A character string "All Event" is displayed in the all-event display area 541. Further, in the all-event display area 541, occurrence dates and times of all detected events are displayed so as to be aligned in the vertical direction. When the detected event is the error event, the alarm event, or the notification event, an icon indicating a type of the event is displayed next to the occurrence date and time. This icon is the same as the icon displayed in the event display area 502 when the event is detected.

In this example, no icon is displayed next to an occurrence date and time of the specific event, but a unique icon indicating the specific event may be displayed next to the occurrence date and time of the specific event. The user can easily recognize a type of each of the events that have occurred by visually recognizing the presence or absence of an icon and a type of the icon in the all-event display area 541. In the example of FIG. 16, occurrence dates and times of four events are displayed in the all-event display area 541.

Types of these four events are respectively the error event, the alarm event, the error event, and the specific event from the top.

In the explanation display area 542, simple explanations of some buttons of the operation unit 260 are displayed. The example of FIG. 16 illustrates that the air volume adjustment screen 510 is switched to another first layer screen 500 by operating the left button 263 or the right button 264. Further, when the OK button 265 is operated, it is illustrated that a transition is made to an event detail screen illustrating details of each event.

Figure 17:
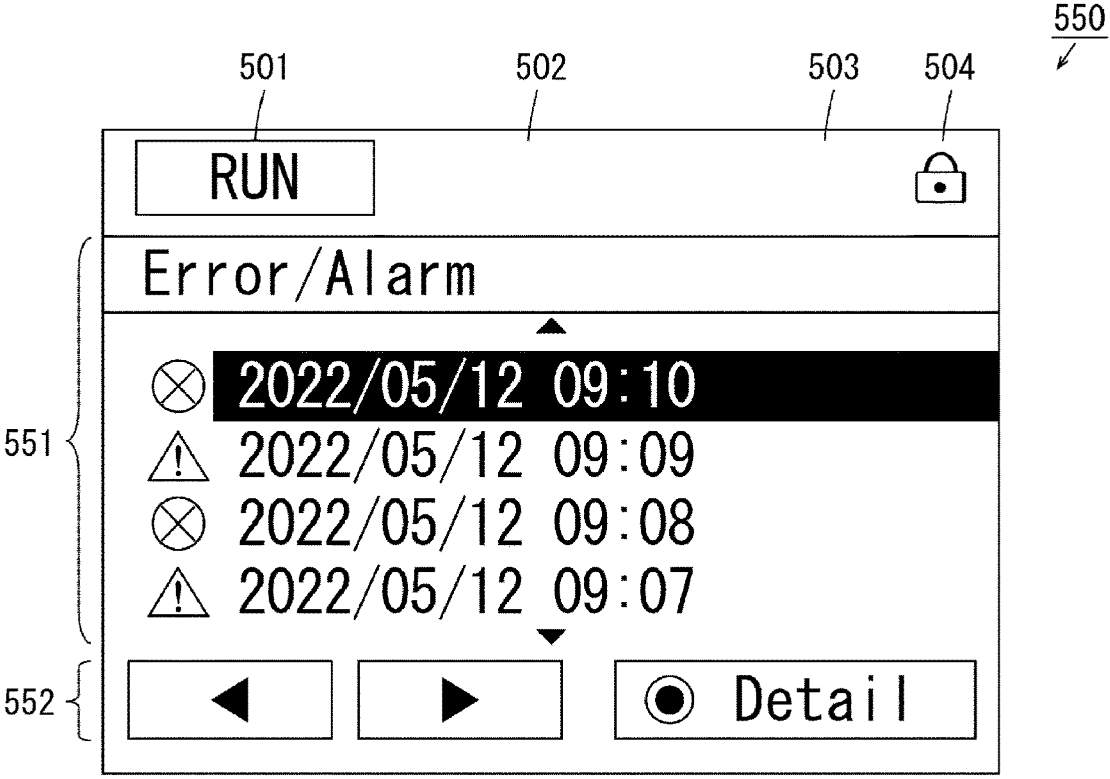
FIG. 17 is a view illustrating an example of a second event history screen.

FIG. 17 is a view illustrating an example of the second event history screen 550. As illustrated in FIG. 17, the running state display area 501, the event display area 502, the eco-mode display area 503, and the lock mode display area 504 are displayed on the second event history screen 550. Further, an error/alarm event display area 551 and an explanation display area 552 are displayed on the second event history screen 550. The explanation display area 552 is the same as the explanation display area 542 of the first event history screen 540.

A character string "Error/Alarm" is displayed in the error/alarm event display area 551. Further, in the error/alarm event display area 551, occurrence dates and times of the error event and the alarm event among all the detected events are displayed so as to be aligned in the vertical direction. The circular or triangular icon indicating the event type is displayed next to the occurrence date and time of the event. In the example of FIG. 17, occurrence dates and times of four events are displayed in the error/alarm event display area 551. Types of these four events are respectively the error event, the alarm event, the error event, and the alarm event from the top.

Figure 18:
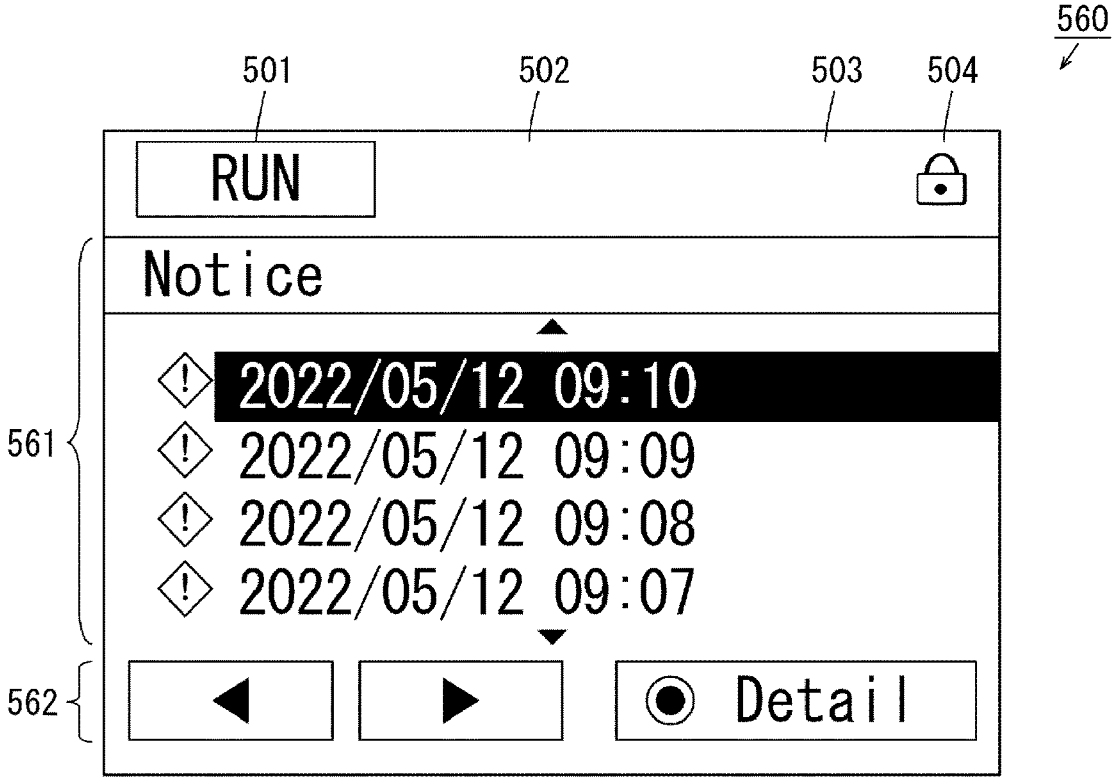
FIG. 18 is a view illustrating an example of a third event history screen.

FIG. 18 is a view illustrating an example of the third event history screen 560. As illustrated in FIG. 18, the running state display area 501, the event display area 502, the eco-mode display area 503, and the lock mode display area 504 are displayed on the third event history screen 560. Further, a notification event display area 561 and an explanation display area 562 are displayed on the third event history screen 560. The explanation display area 562 is the same as the explanation display area 542 of the first event history screen 540.

A character string "Notice" is displayed in the notification event display area 561. Further, in the notification event display area 561, occurrence dates and times of the notification events among all the detected events are displayed so as to be aligned in the vertical direction. The diamond-shaped icon indicating the type of the notification event is displayed next to the occurrence date and time of the event. In the example of FIG. 18, occurrence dates and times of four notification events are displayed in the notification event display area 561.

Although the first event history screen 540, the second event history screen 550, and the third event history screen 560 are displayed as the first layer screen 500 in a switchable manner in this example, the embodiment is not limited thereto. Only the event history screen selected by a setting from among the first event history screen 540, the second event history screen 550, and the third event history screen 560 may be displayable as the first layer screen 500.

Figure 19:
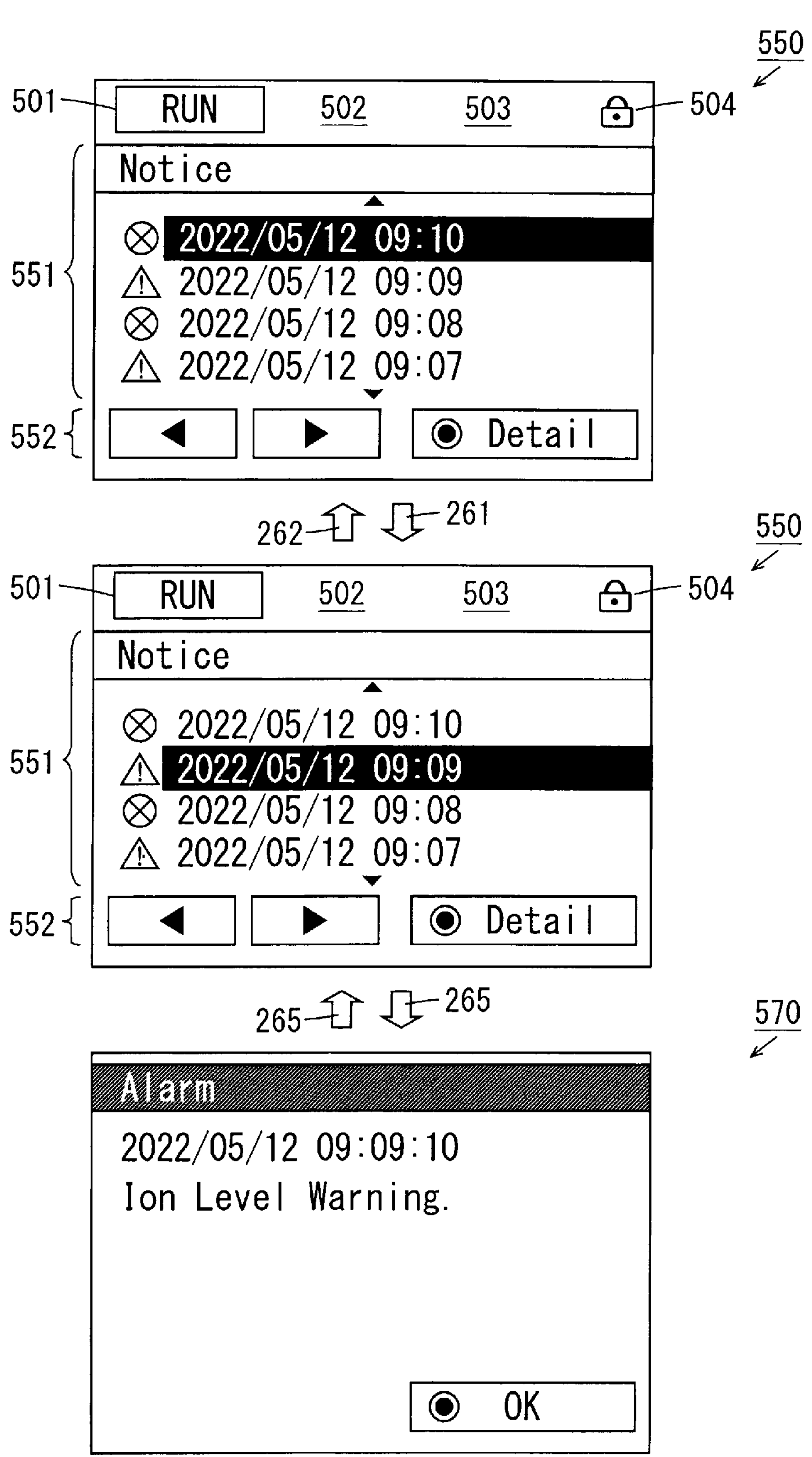
FIG. 19 is a view for describing procedures for displaying an event detail screen.

When an event is selected on the first event history screen 540, the second event history screen 550, or the third event history screen 560, an event detail screen indicating details of the event is displayed on the display unit 250. FIG. 19 is a view for describing procedures for displaying the event detail screen. Although FIG. 19 illustrates the procedures using the second event history screen 550, procedures using the first event history screen 540 or the third event history screen 560 are also similar to the procedures using the second event history screen 550.

As illustrated in the upper part and the middle part of FIG. 19, any of events can be selected by operating the up button 261 or the down button 262 of the operation unit 260 in a state where the second event history screen 550 is displayed on the display unit 250. In the error/alarm event display area 551, an occurrence date and time of the selected event is displayed in a distinguishable manner.

As illustrated in the middle part and the lower part of FIG. 19, when the OK button 265 of the operation unit 260 is operated in the state where any of the events is selected, the display of the display unit 250 is switched from the second event history screen 550 to the event detail screen 570. Meanwhile, when the OK button 265 is operated again, the display of the display unit 250 returns from the event detail screen 570 to the second event history screen 550.

The event detail screen 570 of FIG. 19 displays that the selected event is the alarm event. Further, it is displayed that the selected event has occurred at 9:09:10 on May 12, 2022. Furthermore, it is displayed that the selected event is an event related to the ion current value (the ion level alarm event).

Figures 20, 21:
FIG. 20 is a view illustrating an example of a second layer screen.
FIG. 21 is a view illustrating a first example of a setting screen.

When the OK button 265 of the operation unit 260 is operated in a state where the air volume adjustment screen 510, the first monitor screen 520, or the second monitor screen 530 is displayed on the display unit 250, the second layer screen is displayed on the display unit 250. FIG. 20 is a view illustrating an example of the second layer screen. A second layer screen 600 of FIG. 20 is the menu screen for performing various settings. Note that the display of the display unit 250 returns to the immediately preceding first layer screen 500 when the cancel button 266 of the operation unit 260 is operated in a state where the second layer screen 600 is displayed on the display unit 250.

As illustrated in FIG. 20, a plurality of setting target items are displayed on the second layer screen 600 so as to be aligned in the vertical direction. The plurality of setting target items include a basic setting of the static eliminator 200, an advance setting of the static eliminator 200, a setting of the ion balance sensor 100, and the like. When the up button 261 or the down button 262 of the operation unit 260 is operated, any setting target item can be selected. Further, when the OK button 265 is operated, setting screens on and after a third layer screen for setting details of the selected setting target item are displayed on the display unit 250.

The setting screens mainly include a setting screen of a list selection method and a setting screen of a numerical value selection method. FIG. 21 is a view illustrating a first example of the setting screen. As illustrated in FIG. 21, a setting screen 610 is a setting screen of a list selection method for selecting on or off of the eco-mode. On the setting screen 610, the up button 261 or the down button 262 of the operation unit 260 is operated to select on or off of the eco-mode. Further, when the OK button 265 is operated, the selected on or off is set.

Figures 22, 23:
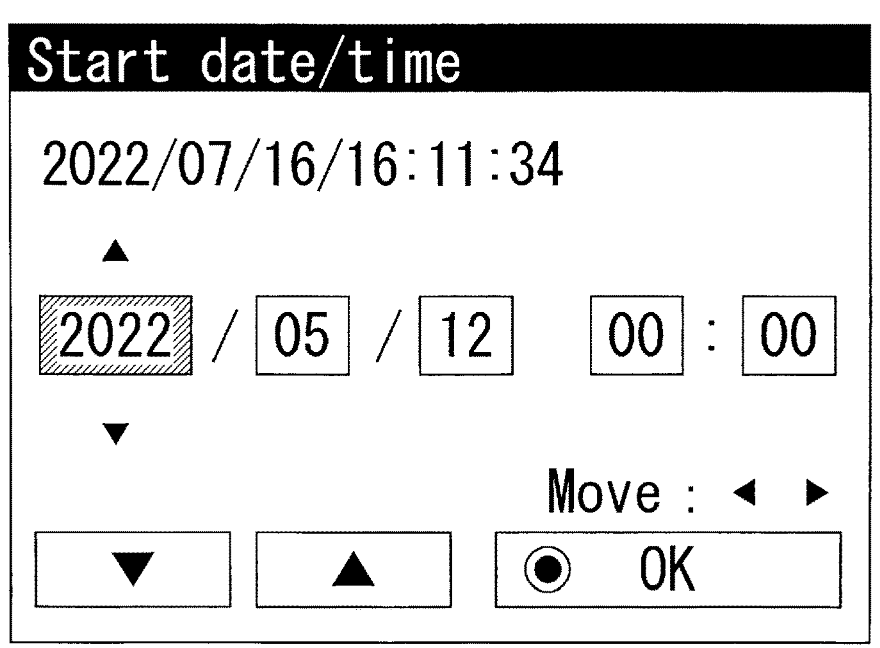
FIG. 22 is a view illustrating a second example of the setting screen.
FIG. 23 is a view illustrating a third example of the setting screen.

FIG. 22 is a view illustrating a second example of the setting screen. As illustrated in FIG. 22, a setting screen 620 is a setting screen of a list selection method for selecting an air volume level of the fan 201. The air volume level of the fan 201 is selected by operating the up button 261 or the down button 262 of the operation unit 260. Further, when the OK button 265 is operated, the selected air volume level is set.

FIG. 23 is a view illustrating a third example of the setting screen. As illustrated in FIG. 23, a setting screen 630 is a setting screen of a numerical value selection method for selecting a date and time. When the left button 263 or the right button 264 of the operation unit 260 is operated, a field corresponding to the Anno Domini, the month, the date, the hour, or the minute is selected. Further, when the up button 261 or the down button 262 is operated, a numerical value of the selected field is increased or decreased. Furthermore, when the OK button 265 is operated, the numerical values indicating the selected date and time are set.

FIG. 24 is a view illustrating a fourth example of the setting screen. As illustrated in FIG. 24, a setting screen 640 is a setting screen of a numerical value selection method for selecting a temperature threshold. When the left button 263 or the right button 264 of the operation unit 260 is operated, a field corresponding to an upper limit or a lower limit of the threshold is selected. Further, when the up button 261 or the down button 262 is operated, a numerical value of the selected field is increased or decreased. Furthermore, when the OK button 265 is operated, numerical values indicating the upper limit and the lower limit of the selected threshold are set.

FIG. 25 is a view illustrating a fifth example of the setting screen. As illustrated in FIG. 25, a setting screen 650 is a setting screen of a numerical value selection method for selecting an IP address of the static eliminator 200. When the left button 263 or the right button 264 of the operation unit 260 is operated, a field corresponding to a digit of the IP address is selected. Further, when the up button 261 or the down button 262 is operated, a numerical value of the selected digit is increased or decreased. Furthermore, when the OK button 265 is operated, the numerical values indicating the selected IP address are set.

7. Basic Configuration of Control Device

Figure 26:
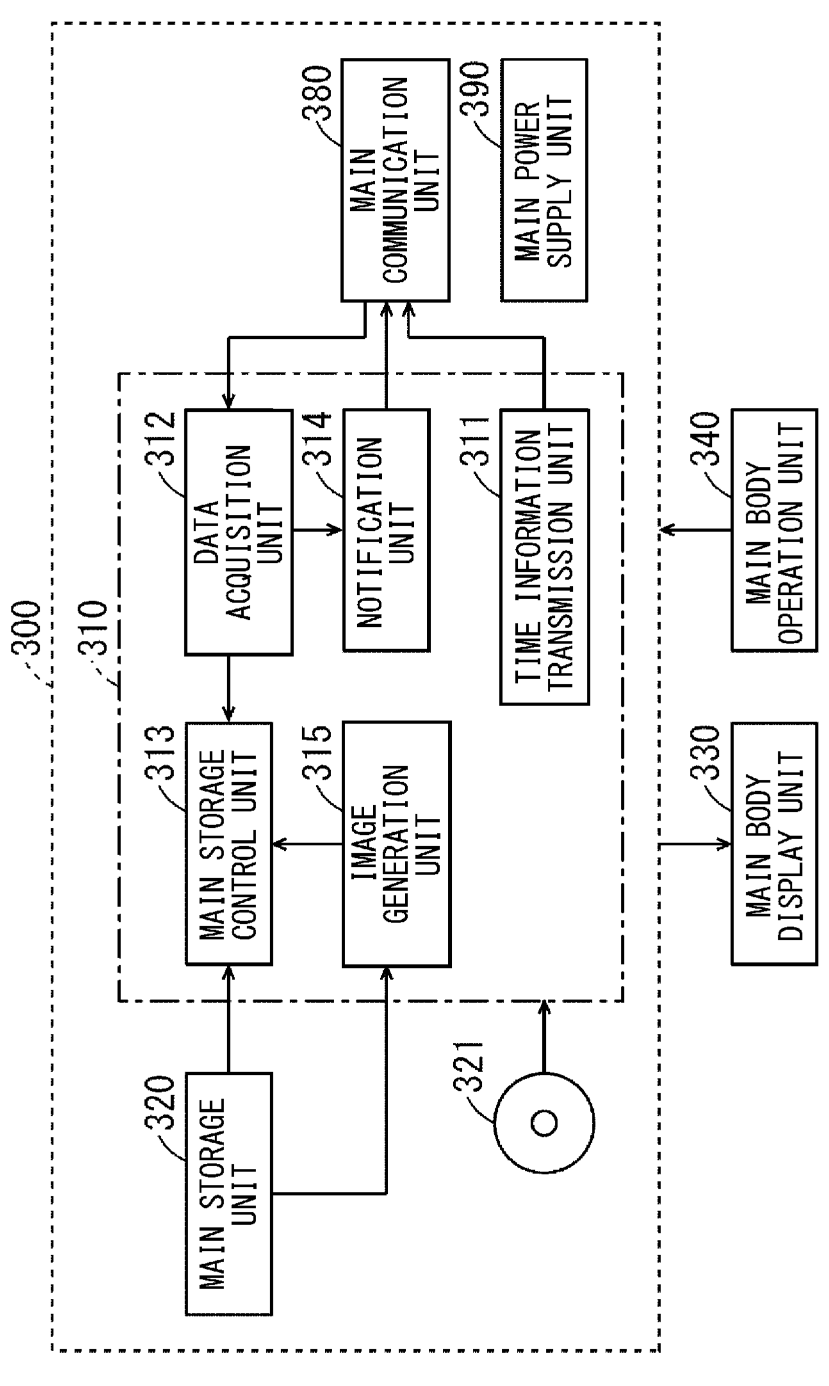
FIG. 26 is a block diagram for describing a configuration of a control device in FIG. 1.

FIG. 26 is a block diagram for describing a configuration of the control device 300 of FIG. 1. As illustrated in FIG. 26, the control device 300 includes the main control unit 310, a main storage unit 320, a main communication unit 380, and a main power supply unit 390. For example, time supplied by a time server is set in the control device 300.

The main communication unit 380 is connected to the network 309 of FIG. 1. The main communication unit 380 receives signals of various types of information transmitted from the static eliminator communication units 280 (FIG. 8) of the plurality of static eliminators 200 via the network 309, and gives the signals to the main control unit 310. Further, the main communication unit 380 transmits signals of various types of information output from the main control unit 310 to the plurality of static eliminators 200. The main power supply unit 390 receives power supplied from a commercial power supply through a power supply cable (not illustrated), and supplies the received power to other constituent elements provided in the control device 300.

The main control unit 310 includes, for example, a CPU. The main storage unit 320 includes, for example, a hard disk, a ROM, and a RAM. The main control unit 310 and the main storage unit 320 may be realized by a microcomputer. The main storage unit 320 stores a control device management program for performing the plurality of static eliminators 200 and history data.

The main control unit 310 includes, as functional units, a time information transmission unit 311, a data acquisition unit 312, a main storage control unit 313, a notification unit 314, and an image generation unit 315. The main control unit 310 executes the control device management program to implement the functional units of the main control unit 310.

The control device management program may be stored in a computer-readable storage medium 321 such as a CD-ROM instead of the main storage unit 320. Alternatively, the control device management program may be provided in a form of being stored in the storage medium 321 and installed in the main storage unit 320. Note that some or all of the functional units of the main control unit 310 may be implemented by hardware such as an electronic circuit.

The time information transmission unit 311 receives a request for transmission of time information from the time setting unit 231 (FIG. 8) of the static eliminator control unit 230 through the network 309. Further, when receiving the request for transmission of time information, the time information transmission unit 311 transmits the time information indicating the time set in the control device 300 to the time setting unit 231 through the network 309.

The data acquisition unit 312 acquires history data stored in the static eliminator storage unit 270 (FIG. 8) of the static eliminator 200 via the network 309. Here, the user can set a cycle for acquiring the history data in a case where communication is established between the static eliminator 200 and the control device 300 by operating the main body operation unit 340. The history data stored in the static eliminator storage unit 270 is acquired at the set cycle. Further, the user can designate a timing for acquiring the history data by operating the main body operation unit 340. In this case, the history data stored in the static eliminator storage unit 270 is acquired at the timing designated by the user.

Further, all pieces of the history data stored in the static eliminator storage unit 270 are acquired in this example, but the embodiment is not limited thereto. The user can select a measurement value (item) included in history data to be acquired by operating the main body operation unit 340. In this case, only history data including the selected item is acquired from the static eliminator storage unit 270.

The main storage control unit 313 stores the history data acquired by the data acquisition unit 312 in the main storage unit 320. In this case, it is unnecessary to leave the history data in the static eliminator storage unit 270. Therefore, when the history data is acquired by the data acquisition unit 312, the notification unit 314 notifies the static eliminator 200 of such a fact. As a result, the history data stored in the static eliminator storage unit 270 can be deleted even when a data amount of the history data stored in the static eliminator storage unit 270 does not reach an upper limit.

The image generation unit 315 generates history image data indicating a history image related to the history data. The generated history image data may be stored in the main storage unit 320 by the main storage control unit 313. Alternatively, the history image may be displayed on the main body display unit 330 based on the generated history image data.

FIG. 27 is a view illustrating an example of the history image. History image data indicating the history image in FIG. 27 is mainly generated based on the second data and the third data in the history data. As illustrated in FIG. 27, in the history image, an occurrence date and time of an event, an event name, measurement values at the time of occurrence of the event, and various thresholds are displayed so as to correspond to each other. The user can easily confirm a detailed situation when the event occurs by visually recognizing the history image.

8. Static Eliminator Management Process

In the static eliminator 200, the static eliminator control unit 230 executes het static eliminator management program to perform a static eliminator management process. The static eliminator management process includes a time setting process, a temporary storage unit control process, and a static eliminator storage unit control process. The static eliminator management process is started in response to a start of the operation of the static eliminator 200. Note that, when the static eliminator 200 starts operating, operations of the fan drive unit 202, the positive-polarity-side high voltage circuit 212, the negative-polarity-side high voltage circuit 222, the display unit 250, the cleaning device 291, the indicator lamp 292, and the alarm device 293 are appropriately controlled by the device control unit 232.

Figure 28:
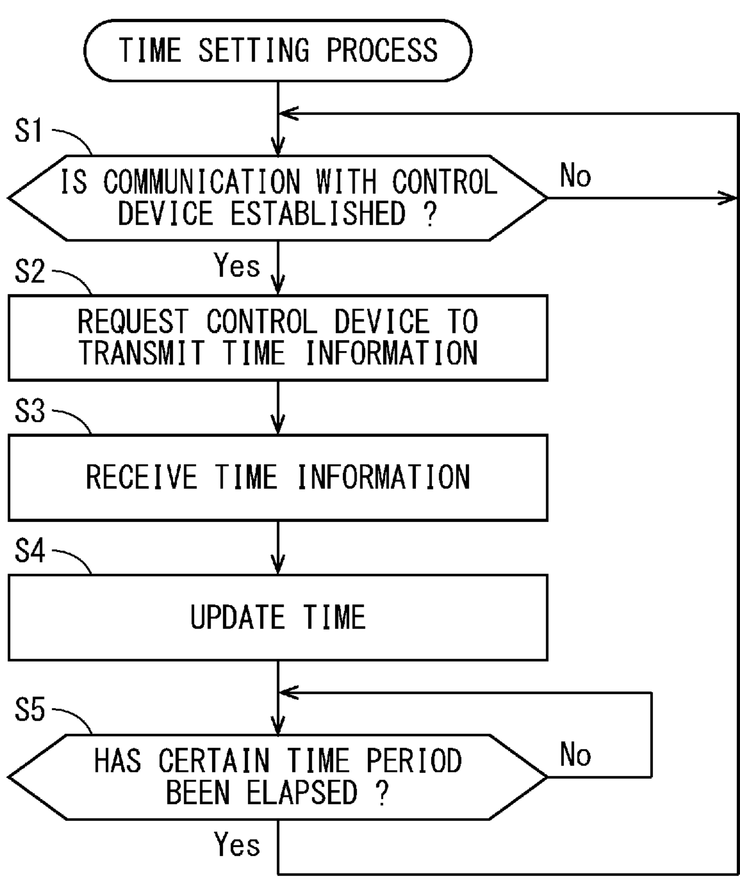
FIG. 28 is a flowchart illustrating an example of a time setting process performed in the static eliminator.

FIG. 28 is a flowchart illustrating an example of the time setting process performed in the static eliminator 200. The time setting process is performed as the static eliminator control unit 230 executes the time setting program of the static eliminator management program. Hereinafter, the time setting process will be described with reference to the static eliminator control unit 230 of FIG. 8 and the flowchart of FIG. 28.

First, the time setting unit 231 determines whether or not communication with the control device 300 is established (Step S1). In a case where the static eliminator communication unit 280 of the static eliminator 200 is connected to the network 309 of FIG. 1, the time setting unit 231 determines that the communication with the control device 300 is established. In a case where the communication with the control device 300 is not established, the time setting unit 231 waits until the communication with the control device 300 is established.

In a case where the communication with the control device 300 is established, the time setting unit 231 requests the control device 300 to transmit time information (Step S2). Next, the time setting unit 231 receives the time information transmitted by the control device 300 (Step S3). Step S3 is executed in response to Step S32 of FIG. 31 to be described later. Subsequently, the time setting unit 231 updates set time to time indicated by the time information received in Step S3 (Step S4).

Thereafter, the time setting unit 231 determines whether or not a certain time period has elapsed (Step S5). The certain time period in Step S5 may be 12 hours, 24 hours, 48 hours, or the like. In a case where the certain time period has not elapsed, the time setting unit 231 waits until the certain time period elapses. When the certain time period has elapsed, the time setting unit 231 returns to Step S1. As a result, the processing from Step S1 is repeated.

Figure 29:
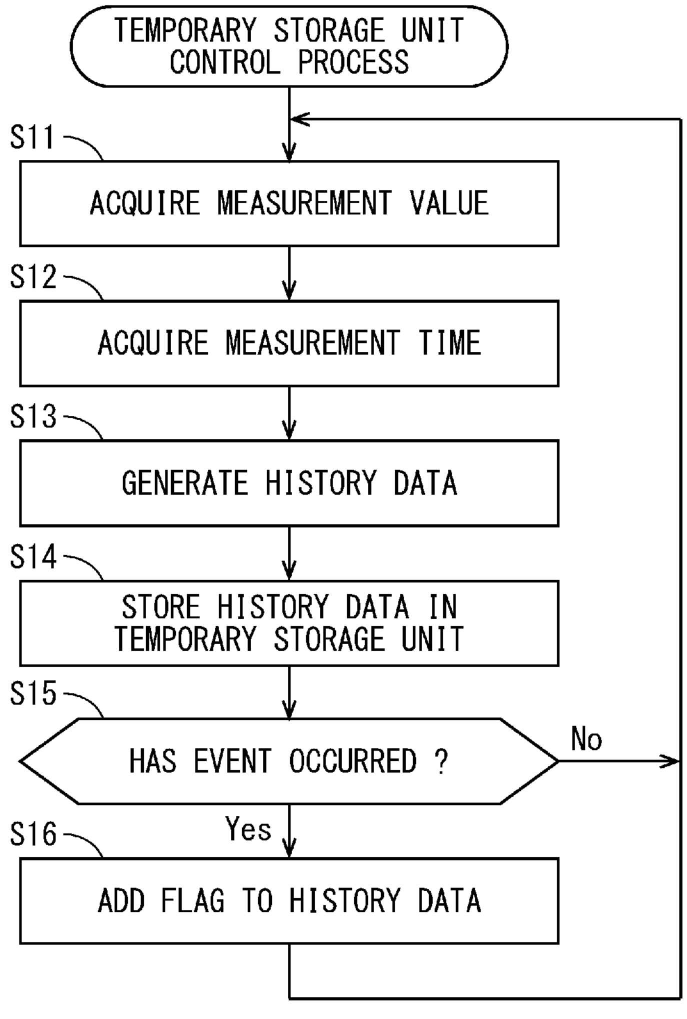
FIG. 29 is a flowchart illustrating an example of a temporary storage unit control process performed in the static eliminator.

FIG. 29 is a flowchart illustrating an example of the temporary storage unit control process performed in the static eliminator 200. The temporary storage unit control process is performed as the static eliminator control unit 230 executes the temporary storage unit control program of the static eliminator management program. Hereinafter, the temporary storage unit control process will be described with reference to the static eliminator control unit 230 of FIG. 8 and the flowchart of FIG. 29.

First, the measurement value acquisition unit 233 acquires a measurement value related to control by the device control unit 232 (Step S11). Further, the measurement value acquisition unit 233 acquires a measurement time of the measurement value acquired in Step S11 based on the time set by the time setting unit 231 (Step S12). The data generation unit 234 generates history data based on the measurement value acquired in Step S11 and the measurement time acquired in Step S12 (Step S13).

The storage control unit 235 stores the history data generated in Step S13 in the temporary storage unit 271 (Step S14). Here, the determination unit 236 determines whether or not an event has occurred with respect to the measurement value of the history data stored in the temporary storage unit 271 in Step S14 (Step S15). Whether or not an event has occurred is determined based on a measurement value and a threshold for the measurement value. In a case where an event has occurred, the determination unit 236 adds a flag to the history data stored in the temporary storage unit 271 in Step S14 (Step S16).

In a case where no event has occurred in Step S15 or in a case where Step S16 has been executed, the processing returns to Step S11. As a result, the processing from Step S11 is repeated. A time interval at which Step S11 is repeated is the second time period (0.1 seconds in this example) as described above.

Figure 30:
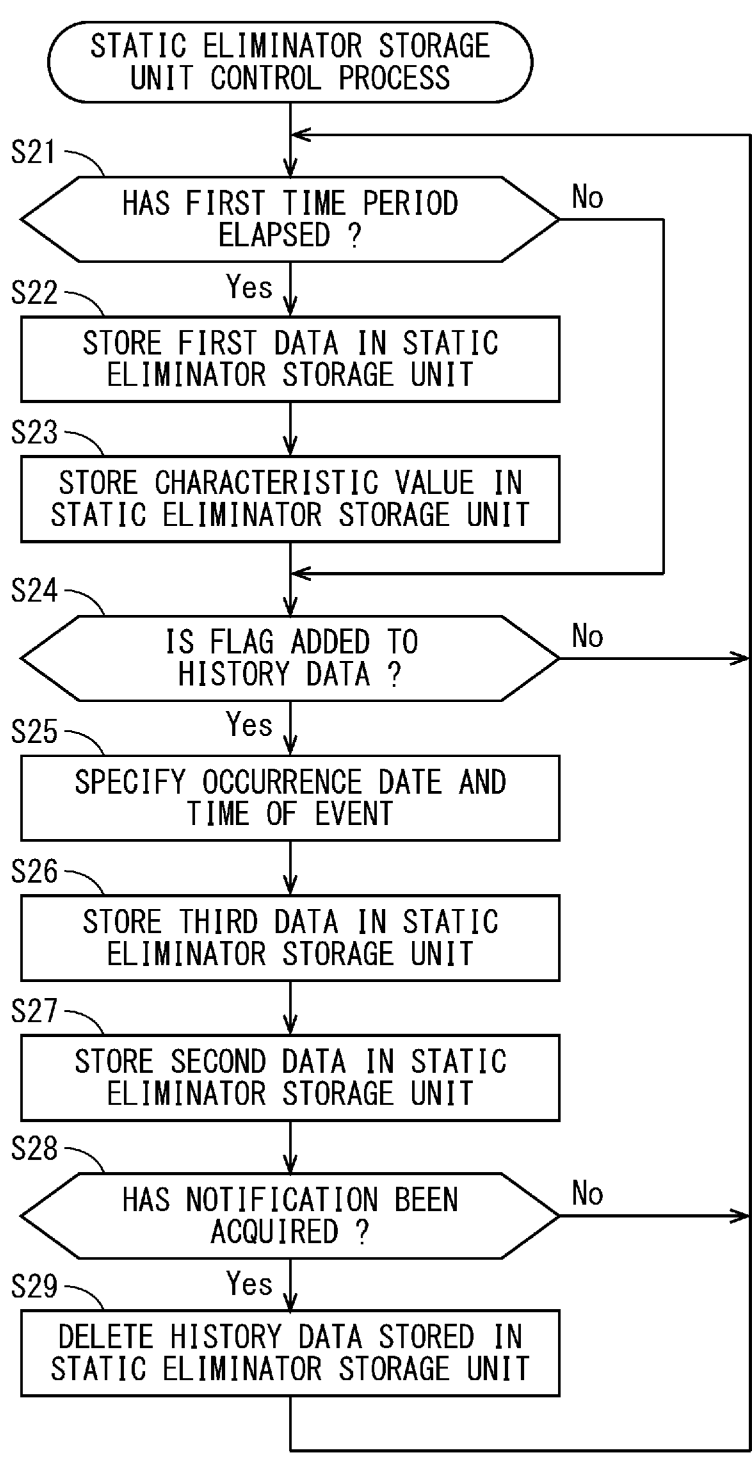
FIG. 30 is a flowchart illustrating an example of a static eliminator storage unit control process performed in the static eliminator.

FIG. 30 is a flowchart illustrating an example of the static eliminator storage unit control process performed in the static eliminator 200. The static eliminator storage unit control process is performed as the static eliminator control unit 230 executes the static eliminator storage unit control program of the static eliminator management program. Hereinafter, the static eliminator storage unit control process will be described with reference to the static eliminator control unit 230 of FIG. 8 and the flowchart of FIG. 30.

First, the storage control unit 235 determines whether or not the first time period (1 hour in this example) has elapsed (Step S21). In a case where the first time period has not elapsed, the processing proceeds to Step S24. In a case where the first time period has elapsed, the storage control unit 235 causes the static eliminator storage unit 270 to store the history data stored in the temporary storage unit 271 as the first data at a time point when the first time period has elapsed (Step S22).

Further, the storage control unit 235 causes the static eliminator storage unit 270 to store a characteristic value of the measurement value in the history data stored in the temporary storage unit 271 within the first time period (Step S23). In this example, in Step S23, a maximum value and a minimum value of the temperature and humidity within the first time period are stored in the static eliminator storage unit 270 as characteristic values of the measurement value. Further, in Step S23, a maximum value and a minimum value of ion balance between the time point at which the first time period has elapsed and a time point one minute before the time point are stored in the static eliminator storage unit 270 as characteristic values of the measurement value.

Thereafter, in Step S16 in FIG. 29, the storage control unit 235 determines whether or not the flag is added to the history data stored in the temporary storage unit 271 (Step S24). In a case where no flag is not added to the history data, the processing returns to Step S21. When the flag is added to the history data, the storage control unit 235 specifies a date and time when the data has been acquired, that is, an occurrence date and time of the event (Step S25). Further, the storage control unit 235 stores the data indicating the date and time specified in Step S25 in the static eliminator storage unit 270 as the third data (Step S26).

Furthermore, the storage control unit 235 stores the history data stored in the temporary storage unit 271 for a certain period including the event occurrence time specified in Step S25 in the static eliminator storage unit 270 as the second data (Step S27). In this example, in Step S27, the history data stored in the temporary storage unit 271 in a period from 30 seconds before the event occurrence time to 30 seconds after the event occurrence time is stored as the second data.

Next, the notification acquisition unit 237 determines whether or not a notification indicating that the control device 300 has acquired the history data stored in the static eliminator storage unit 270 has been acquired (Step S28). In a case where Step S36 of FIG. 31, which will be described later, has been executed, it is determined that the notification has been acquired. In a case where the notification has been acquired, the storage control unit 235 deletes the history data stored in the static eliminator storage unit 270 (Step S29). In a case where the notification is not acquired in Step S28 or in a case where Step S29 has been executed, the processing returns to Step S21. As a result, the processing from Step S21 is repeated.

9. Control Device Management Process

Figure 31:
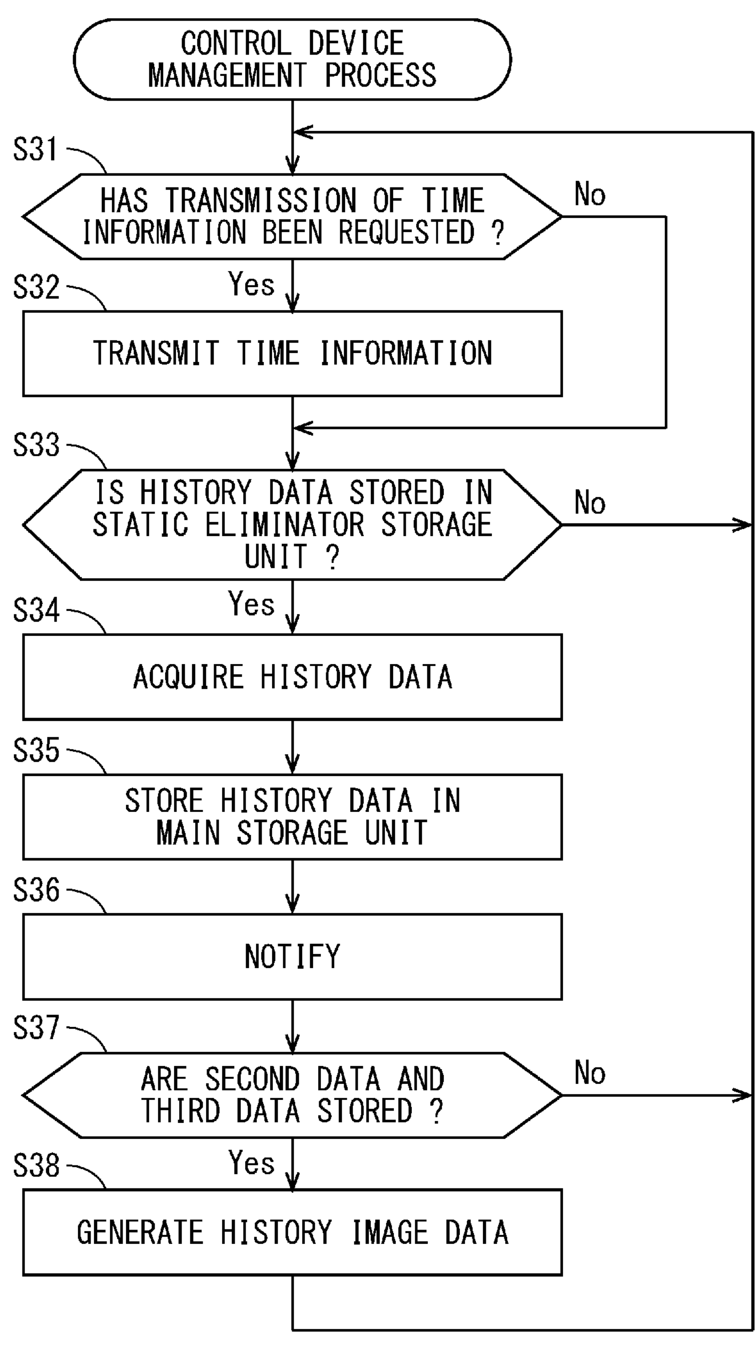
FIG. 31 is a flowchart illustrating an example of a control device management process performed in the control device.

In the control device 300, a control device management process is performed as the main control unit 310 executes the control device management program. FIG. 31 is a flowchart illustrating an example of the control device management process performed by the control device 300. The control device management process will be described below with reference to the main control unit 310 of FIG. 26 and the flowchart of FIG. 31.

First, the time information transmission unit 311 determines whether or not transmission of time information has been requested from the static eliminator 200 (Step S31). In a case where Step S2 of FIG. 28 has been executed, it is determined that the transmission of the time information has been requested. In a case where the transmission of the time information is not requested, the processing proceeds to Step S3. In a case where the transmission of the time information has been requested, the time information transmission unit 311 transmits the time information to the static eliminator 200 (Step S32).

Next, the data acquisition unit 312 determines whether or not history data is stored in the static eliminator storage unit 270 of the static eliminator 200 (Step S33). In a case where Step S22 or each of Steps S26 and S27 of FIG. 30 has been executed, the history data is stored in the static eliminator storage unit 270 until Step S29 is executed.

In a case where the history data is not stored in the static eliminator storage unit 270, the processing returns to Step S31. In a case where the history data is stored in the static eliminator storage unit 270, the data acquisition unit 312 acquires the history data from the static eliminator storage unit 270 (Step S34). Further, the main storage control unit 313 stores the history data acquired in Step S34 in the main storage unit 320 (Step S35). The notification unit 314 notifies the static eliminator 200 that the history data has been acquired (Step S36).

Thereafter, in Step S35, the image generation unit 315 determines whether or not the second data and the third data are stored in the main storage unit 320 as the history data (Step S37). When the second data and the third data are stored in the main storage unit 320, the image generation unit 315 generates history image data indicating the history image of FIG. 27 based on the second data and the third data (Step S38). In a case where the second data and the third data are not stored in the main storage unit 320 of Step S37 or in a case where Step S38 has been executed, the processing returns to Step S31. As a result, the processing from Step S31 is repeated.

The history image data generated in Step S38 may be stored in the main storage unit 320. Here, in a case where previously history image data is stored in the main storage unit 320, the history image data may be updated to the newly generated history image data. Further, a history image based on the history image data generated in Step S38 may be displayed on the main body display unit 330.

10. Effects

The static elimination system 1 according to the present embodiment includes the static eliminator 200 and the control device 300. The static eliminator 200 and the control device 300 can be connected by connecting the static eliminator communication unit 280 of the static eliminator 200 and the main communication unit 380 of the control device 300 to the network 309.

In the static eliminator 200, ions are generated by the positive ion generation unit 211 and the negative ion generation unit 221 under control of the device control unit 232. Further, the measurement value acquisition unit 233 acquires a measurement value related to the control by the device control unit 232 and a measurement time at which the measurement value has been acquired. History data is generated by the data generation unit 234 based on the measurement value and the measurement time, and the generated history data is stored in the static eliminator storage unit 270.

According to this configuration, even in a case where the control device 300 is not connected to the static eliminator 200, the history data is stored in the static eliminator storage unit 270 provided in the static eliminator 200. Therefore, the history data can be easily stored without being lost. Therefore, a user does not need to frequently connect the control device 300 to the static eliminator 200 in order to manage the history data. As a result, a manufacturing status of a product can be strictly managed without increasing a management burden.

Further, when the static eliminator 200 and the control device 300 are connected, the history data stored in the static eliminator storage unit 270 of the static eliminator 200 is acquired by the data acquisition unit 312 of the control device 300 via the network 309. As a result, even in a case where the static eliminator 200 and the control device 300 are not always connected, it is possible to manage the history data in the control device 300 without causing a loss in the history data.

The history data includes first data, second data, and third data. The first data is data in which measurement values acquired at intervals of a first time period are associated with measurement times. The first data makes it possible to manage a behavior of the static eliminator 200 in a normal state. The second data is data in which measurement values acquired when various events have occurred are associated with measurement times. The second data makes it possible to manage a behavior of the static eliminator 200 when the event has occurred. The third data is data indicating a date and time when various events have occurred. The third data makes it possible to manage the date and time when the event has occurred.

The temporary storage unit 271 of the static eliminator 200 stores history data at intervals of a second time period shorter than the first time period. Every time the first time period elapses, history data stored in the temporary storage unit 271 at a time point when the first time period has elapsed is stored as the first data. In this case, the first data can be easily stored in the static eliminator storage unit 270. Further, history data stored in the temporary storage unit 271 for a certain period including an event occurrence time is stored in the static eliminator storage unit 270 as the second data. In this case, the second data can be easily stored in the static eliminator storage unit 270.

Furthermore, every time the first time period elapses, characteristic values of measurement values in the history data stored in the temporary storage unit 271 within the first time period are stored in the static eliminator storage unit 270. In this case, the behavior of the static eliminator 200 in the normal state can be managed in more detail. In particular, the characteristic values include at least one of a maximum value and a minimum value. In this case, the user can intuitively grasp the behavior of the static eliminator 200 in the normal state.

In the temporary storage unit 271, when the history data is stored in the entire predetermined storage area that has been allocated, the latest history data is stored to be overwritten on the history data stored earliest. According to this configuration, even in a case where the capacity of the temporary storage unit 271 is relatively small, it is possible to store history data for a sufficiently long period at intervals of a sufficiently short time period.

In the control device 300, time information indicating time set in the control device 300 is transmitted by the time information transmission unit 311 in response to a request from the static eliminator 200. In the static eliminator 200, the time information is received by the time setting unit 231, and the time indicated by the received time information is set in the static eliminator 200. In this case, the control device 300 and the static eliminator 200 can be easily synchronized in time. Further, even when the plurality of static eliminators 200 are connected to the control device 300, the plurality of static eliminators 200 can be easily synchronized in time.

11. Other Embodiments (1) Although the static elimination system 1 includes the plurality of static eliminators 200 in the above-described embodiment, the embodiment is not limited thereto. The static elimination system 1 may include only one static eliminator 200.

(2) Although the control device 300 and the static eliminator 200 are connected via the network 309 in the above-described embodiment, the embodiment is not limited thereto. The control device 300 and the static eliminator 200 may be connected by a cross cable or the like without the intervention of the network 309. Alternatively, history data may be transferred from the static eliminator storage unit 270 of the static eliminator 200 to the main storage unit 320 of the control device 300 via an external storage medium such as a universal serial bus (USB) memory or an SD card. That is, the static eliminator 200 and the control device 300 may be connectable via an external storage medium.

(3) Although the history data stored in the temporary storage unit 271 at a time point when the first time period has elapsed is stored as the first data in the static eliminator storage unit 270 every time the first time period elapses in the above-described embodiment, the embodiment is not limited thereto. Every time the first time period elapses, history data stored in the temporary storage unit 271 at predetermined time within the first time period may be stored in the static eliminator storage unit 270 as the first data.

(4) Although the history data includes the first data, the second data, and the third data in the above-described embodiment, the embodiment is not limited thereto. The history data may include any one or two of the first data, the second data, and the third data.

(5) Although the static eliminator 200 includes the temporary storage unit 271 in the above-described embodiment, the embodiment is not limited thereto. The static eliminator 200 does not necessarily include the temporary storage unit 271 as long as the history data can be stored in the static eliminator storage unit 270.

(6) Although the characteristic value of the measurement value is at least one of the maximum value and the minimum value in the above-described embodiment, the embodiment is not limited thereto. The characteristic value of the measurement value may be another characteristic value such as an average value. Further, the characteristic value of the measurement value is stored in the static eliminator storage unit 270 in the above-described embodiment, but the characteristic value of the measurement value is not necessarily stored in the static eliminator storage unit 270.

12. Correspondence Relationship Between Each Constituent Element of Claims and Each Unit of Embodiment Hereinafter, an example of the correspondence between each constituent element of the claims and each unit of the embodiment will be described, but the invention is not limited to the following example. Various other elements having the configurations or functions described in the claims can be used as the respective constituent elements of the claims.

In the above-described embodiment, the positive ion generation unit 211 and the negative ion generation unit 221 are examples of an ion generation unit, the device control unit 232 is an example of an ion control unit, and the measurement value acquisition unit 233 is an example of a measurement value acquisition unit. The data generation unit 234 is an example of a data generation unit, the static eliminator storage unit 270 is an example of a nonvolatile storage unit, the static eliminator 200 is an example of a static eliminator, and the temporary storage unit 271 is an example of a volatile storage unit.

The control device 300 is an example of a control device, the network 309 is an example of a network, the static eliminator communication unit 280 is an example of a first communication unit, and the main communication unit 380 is an example of a second communication unit. The data acquisition unit 312 is an example of a data acquisition unit, the static elimination system 1 is an example of a static elimination system, the time setting unit 231 is an example of a time setting unit, and the time information transmission unit 311 is an example of a time information transmission unit.

Note that the invention is not limited to the above-described embodiments, and can be implemented in various modes within a range not departing from the gist of the invention, and can be implemented by combining some configurations of the above-described embodiments.

What is claimed is:

1. A static eliminator comprising:

an ion generation unit that generates ions;

an ion control unit that controls the ion generation unit;

a static eliminator housing, in which the ion generation unit and the ion control unit are accommodated;

a measurement value acquisition unit that acquires a measurement value related to the control by the ion control unit and acquires a measurement time at which the measurement value has been acquired;

a data generation unit that generates history data based on the measurement value and the measurement time; and a nonvolatile storage unit that stores the history data, which is accommodated in the static eliminator housing.

2. The static eliminator according to claim 1, wherein the history data includes first data in which the measurement value acquired at intervals of a first time period is associated with the measurement time.

3. The static eliminator according to claim 2, further comprising a volatile storage unit that stores the history data at intervals of a second time period shorter than the first time period, wherein the nonvolatile storage unit stores, as the first data, the history data stored in the volatile storage unit at predetermined time within the first time period every time the first time period elapses.

4. The static eliminator according to claim 3, wherein the nonvolatile storage unit further stores a characteristic value of the measurement value in the history data stored in the volatile storage unit within the first time period every time the first time period elapses.

5. The static eliminator according to claim 1, wherein the history data includes second data in which the measurement value acquired when a predetermined event has occurred is associated with the measurement time.

6. The static eliminator according to claim 5, further comprising a volatile storage unit that stores the history data at intervals of a predetermined time period, wherein the nonvolatile storage unit stores, as the second data, the history data stored in the volatile storage unit in a certain period including an event occurrence time.

7. The static eliminator according to claim 3, wherein in a case where the history data is stored in an entire predetermined storage area allocated to the volatile storage unit, the volatile storage unit stores the history data that is most recent to be overwritten on the history data stored earliest.

8. The static eliminator according to claim 1, wherein the history data includes third data indicating a date and time when a predetermined event related to the measurement value has occurred.

9. A static eliminator comprising:

an ion generation unit that generates ions;

an ion control unit that controls the ion generation unit;

a measurement value acquisition unit that acquires a measurement value related to the control by the ion control unit and acquires a measurement time at which the measurement value has been acquired;

a data generation unit that generates history data based on the measurement value and the measurement time;

a nonvolatile storage unit that stores the history data; and a fan that sends the ions generated by the ion generation unit in a predetermined direction, wherein the measurement value includes an amount of the ions and a rotational speed of the fan.

10. The static eliminator according to claim 9, wherein the measurement value further includes ion balance.

11. The static eliminator according to claim 10, wherein the measurement value further includes an ion current.

12. A static elimination system comprising:

a static eliminator including an ion generation unit that generates ions, an ion control unit that controls the ion generation unit, a measurement value acquisition unit that acquires a measurement value related to the control by the ion control unit and acquires a measurement time at which the measurement value has been acquired, a data generation unit that generates history data based on the measurement value and the measurement time, and a nonvolatile storage unit that stores the history data; and a control device connectable to the static eliminator, wherein the static eliminator further includes a first communication unit connected to a network, the control device includes:

a second communication unit connected to the network; and a data acquisition unit that acquires the history data stored in the nonvolatile storage unit via the network, the static eliminator further includes a time setting unit that receives time information indicating time set in the control device from the control device and sets the time indicated by the received time information in the static eliminator, the measurement value acquisition unit specifies the measurement time at which the measurement value has been acquired based on the time set by the time setting unit, and the control device further includes a time information transmission unit that transmits the time information to the static eliminator.

* * * * *